(12) United States Patent
Xue et al.

(10) Patent No.: US 11,736,261 B2
(45) Date of Patent: Aug. 22, 2023

(54) LICENSED ASSISTED SIDELINK ACCESS USING AN INDICATION OF MULTIPLE DATA CHANNELS

(71) Applicant: QUALCOMM Incorporated, San Diego, CA (US)

(72) Inventors: Yisheng Xue, San Diego, CA (US); Xiaoxia Zhang, San Diego, CA (US); Jing Sun, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 17/344,423

(22) Filed: Jun. 10, 2021

(65) Prior Publication Data

US 2022/0021508 A1    Jan. 20, 2022

Related U.S. Application Data

(60) Provisional application No. 62/705,818, filed on Jul. 16, 2020.

(51) Int. Cl.
  *H04W 4/00* (2018.01)
  *H04L 5/00* (2006.01)
  *H04L 1/1812* (2023.01)
  *H04W 16/14* (2009.01)
  *H04W 72/0446* (2023.01)
  *H04W 74/08* (2009.01)

(52) U.S. Cl.
  CPC .......... *H04L 5/0094* (2013.01); *H04L 1/1812* (2013.01); *H04W 16/14* (2013.01); *H04W 72/0446* (2013.01); *H04W 74/0808* (2013.01)

(58) Field of Classification Search
  CPC .... H04L 5/0094; H04L 1/1812; H04W 16/14; H04W 72/0446; H04W 74/0808
  See application file for complete search history.

(56) References Cited

U.S. PATENT DOCUMENTS

| | | | |
|---|---|---|---|
| 2018/0054237 A1* | 2/2018 | Tseng | H04W 72/542 |
| 2018/0242234 A1* | 8/2018 | Semaan | H04W 48/18 |
| 2018/0368090 A1* | 12/2018 | Kadambar | H04W 8/005 |

(Continued)

FOREIGN PATENT DOCUMENTS

| | | |
|---|---|---|
| EP | 3678438 A1 | 7/2020 |
| WO | WO-2019214544 A1 | 11/2019 |
| WO | WO-2020092931 A1 | 5/2020 |

OTHER PUBLICATIONS

International Search Report and Written Opinion—PCT/US2021/036936—ISA/EPO—dated Oct. 1, 2021.

(Continued)

*Primary Examiner* — Siren Wei
(74) *Attorney, Agent, or Firm* — Qualcomm Incorporated

(57) ABSTRACT

Various aspects of the present disclosure generally relate to wireless communication. In some aspects, a first user equipment (UE) may transmit, to a second UE via a sidelink sub-channel of a licensed carrier, an indication of multiple data channels of an unlicensed carrier to be used to attempt one or more sidelink communications between the first UE and the second UE. The UE may attempt the one or more sidelink communications between the first UE and the second UE using the multiple data channels. Numerous other aspects are provided.

30 Claims, 13 Drawing Sheets

(56) References Cited

U.S. PATENT DOCUMENTS

| | | | |
|---|---|---|---|
| 2019/0260548 A1* | 8/2019 | Parkvall | H04W 72/51 |
| 2020/0053675 A1 | 2/2020 | Khoryaev et al. | |
| 2020/0205165 A1* | 6/2020 | Huang | H04L 1/1854 |
| 2020/0221372 A1* | 7/2020 | Shih | H04W 76/27 |
| 2020/0351669 A1* | 11/2020 | Xu | H04W 72/56 |
| 2022/0104238 A1* | 3/2022 | Aiba | H04L 5/0053 |
| 2022/0159674 A1* | 5/2022 | Deng | H04W 72/566 |
| 2022/0239446 A1* | 7/2022 | Xu | H04L 5/0055 |

OTHER PUBLICATIONS

LG Electronics: "Summary of Email Discussion on Rel-17 Sidelink Enhancement", 3GPP TSG RAN #86, 3GPP Draft; RP-192745, 3rd Generation Partnership Project (3GPP), Mobile Competence Centre, 650, Route Des Lucioles, F-06921 Sophia-Antipolis Cedex, France, vol. TSG RAN. No. Sitges. ES, Dec. 9, 2019-Dec. 12, 2019, Dec. 2, 2019 (Dec. 2, 2019), 27 Pages, XP051834348, Retrieved from the Internet: URL:https://ftp.3gpp.org/tsg_ran/TSG_RAN/TSGR_86/Docs/RP-192745.zip RP-192745 Email discussion on sidelink enhancement.doc [retrieved on Dec. 2, 2019], p. 14, the whole document.

Moderator (AT&T): "Summary of UE Features for 5G V2X", 3GPP Draft, R1-2004284, 3GPP TSG RAN WG1 #101, 3rd Generation Partnership Project (3GPP), Mobile Competence Centre, 650, Route Des Lucioles, F-06921 Sophia-Antipolis Cedex, France, vol. RAN WG1. No. e-Meeting, May 25, 2020-Jun. 5, 2020, May 26, 2020 (May 26, 2020), XP051891694, 28 Pages, Retrieved from the Internet: URL:https://ftp.3gpp.org/tsg_ran/WG1_RL1/TSGR1_101-e/Docs/R1-2004284.zip R1-2004284.doc [retrieved on May 26, 2020] the Whole Document.

Zte, et al., "Further Enhancement for Sidelink", 3GPP Draft, RWS-210470, 3GPP TSG RAN Rel-18 workshop, 3rd Generation Partnership Project (3GPP), Mobile Competence Centre, 650, Route Des Lucioles, F-06921 Sophia-Antipolis Cedex, France, vol. TSG RAN. No. Electronic Meeting, Jun. 28, 2021-Jul. 2, 2021, Jun. 7, 2021 (Jun. 7, 2021), XP052026021, pp. 1-7, Retrieved from the Internet: URL: https://ftp.3gpp.org/tsg_ran/TSG_RAN_AHs/2021_06_RAN_Rel18_WS/Docs/RWS-210470.zip RWS-210470 Further-enhancement for Sidelink.doc [retrieved on Jun. 7, 2021] the Whole Document.

\* cited by examiner

LICENSED ASSISTED SIDELINK ACCESS USING AN INDICATION OF MULTIPLE DATA CHANNELS

CROSS-REFERENCE TO RELATED APPLICATION

This Patent Application claims priority to Provisional Patent Application No. 62/705,818, filed on Jul. 16, 2020, entitled "LICENSED ASSISTED SIDELINK ACCESS USING AN INDICATION OF MULTIPLE DATA CHANNELS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for licensed assisted sidelink access using an indication of multiple data channels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes: transmitting, to a second UE via a sidelink sub-channel of a licensed carrier, an indication of multiple data channels of an unlicensed carrier to be used to attempt one or more sidelink communications between the first UE and the second UE; and attempting the one or more sidelink communications between the first UE and the second UE using the multiple data channels.

In some aspects, a method of wireless communication performed by a second UE includes: receiving, from a first UE via a sidelink sub-channel of a licensed carrier, an indication of multiple data channels of an unlicensed carrier to be used to attempt one or more sidelink communications between the second UE and the first UE; and attempting the one or more sidelink communications between the second UE and the first UE using the multiple data channels.

In some aspects, a first UE for wireless communication includes: a memory and one or more processors operatively coupled to the memory, the memory and the one or more processors configured to: transmit, to a second UE via a sidelink sub-channel of a licensed carrier, an indication of multiple data channels of an unlicensed carrier to be used to attempt one or more sidelink communications between the first UE and the second UE; and attempt the one or more sidelink communications between the first UE and the second UE using the multiple data channels.

In some aspects, a second UE for wireless communication includes: a memory and one or more processors operatively coupled to the memory, the memory and the one or more processors configured to: receive, from a first UE via a sidelink sub-channel of a licensed carrier, an indication of multiple data channels of an unlicensed carrier to be used to attempt one or more sidelink communications between the second UE and the first UE; and attempt the one or more sidelink communications between the second UE and the first UE using the multiple data channels.

In some aspects, a non-transitory computer-readable medium storing a set of instructions for wireless communication includes: one or more instructions that, when executed by one or more processors of a first UE, cause the first UE to: transmit, to a second UE via a sidelink sub-channel of a licensed carrier, an indication of multiple data channels of an unlicensed carrier to be used to attempt one or more sidelink communications between the first UE and the second UE; and attempt the one or more sidelink communications between the first UE and the second UE using the multiple data channels.

In some aspects, a non-transitory computer-readable medium storing a set of instructions for wireless communication includes: one or more instructions that, when executed by one or more processors of a second UE, cause the second UE to: receive, from a first UE via a sidelink sub-channel of a licensed carrier, an indication of multiple data channels of an unlicensed carrier to be used to attempt one or more sidelink communications between the second UE and the first UE; and attempt the one or more sidelink communications between the second UE and the first UE using the multiple data channels.

In some aspects, a first apparatus for wireless communication includes: means for transmitting, to a second apparatus via a sidelink sub-channel of a licensed carrier, an indication of multiple data channels of an unlicensed carrier to be used to attempt one or more sidelink communications between the first apparatus and the second apparatus; and means for attempting the one or more sidelink communications between the first apparatus and the second apparatus using the multiple data channels.

In some aspects, a second apparatus for wireless communication includes: means for receiving, from a first apparatus via a sidelink sub-channel of a licensed carrier, an indication of multiple data channels of an unlicensed carrier to be used to attempt one or more sidelink communications between the second apparatus and the first apparatus; and means for attempting the one or more sidelink communications between the second apparatus and the first apparatus using the multiple data channels.

Aspects generally include a method, apparatus, system, computer program product, non-transitory computer-readable medium, user equipment, base station, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
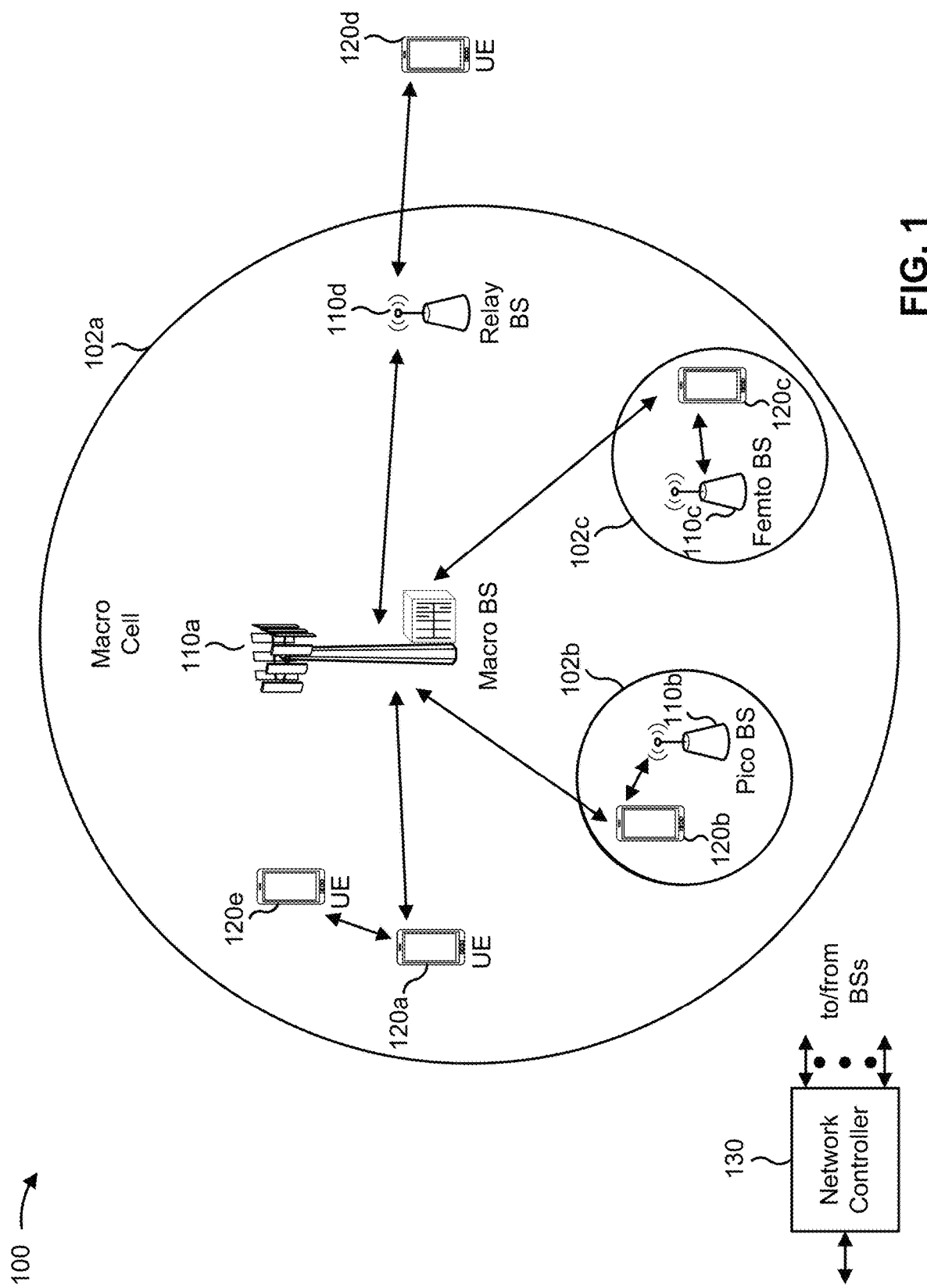
FIG. 1 is a diagram illustrating an aspect of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
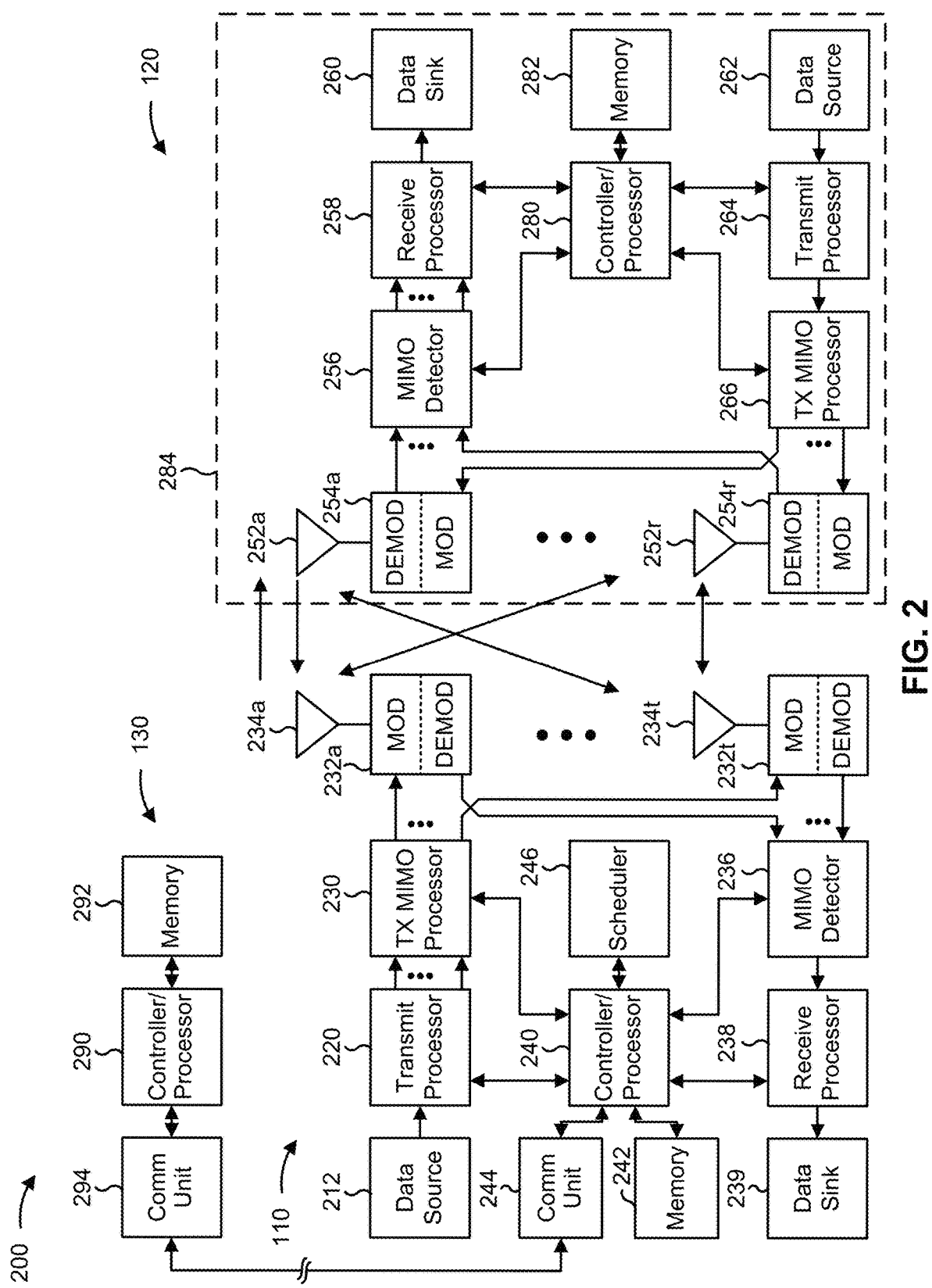
FIG. 2 is a diagram illustrating an aspect of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 12-13.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 12-13.

Controller/processor 240 of base station 110, controller/processor 280 of UE 120, and/or any other component(s) of FIG. 2 may perform one or more techniques associated with licensed assisted sidelink access using an indication of multiple data channels, as described in more detail elsewhere herein. In some aspects, controller/processor 240 of base station 110, controller/processor 280 of UE 120, and/or any other component(s) of FIG. 2 may perform or direct operations of, in some aspects, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. In some aspects, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, in some aspects, process 1200 of FIG. 12, process 1300 of FIG. 13, and/or other processes as described herein. In some aspects, executing instructions may include running the instructions, converting the instructions, compiling the instructions, and/or interpreting the instructions.

In some aspects, UE 120 may include means for transmitting, to a second UE via a sidelink sub-channel of a licensed carrier, an indication of multiple data channels of an unlicensed carrier to be used to attempt one or more sidelink communications between the first UE and the second UE; and/or means for attempting the one or more sidelink communications between the first UE and the second UE using the multiple data channels. Additionally, or alternatively, UE 120 may include means for receiving, from a first UE via a sidelink sub-channel of a licensed carrier, an indication of multiple data channels of an unlicensed carrier to be used to attempt one or more sidelink communications between the second UE and the first UE; and/or means for attempting the one or more sidelink communications between the second UE and the first UE using the multiple data channels. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

While blocks in FIG. 2 are illustrated as distinct components, the functions described above with respect to the blocks may be implemented in a single hardware, software, or combination component or in various combinations of components. In some aspects, the functions described with respect to the transmit processor 264, the receive processor 258, and/or the TX MIMO processor 266 may be performed by or under the control of controller/processor 280.

As indicated above, FIG. 2 is provided as an aspect. Other aspects may differ from what is described with regard to FIG. 2.

Figure 3:
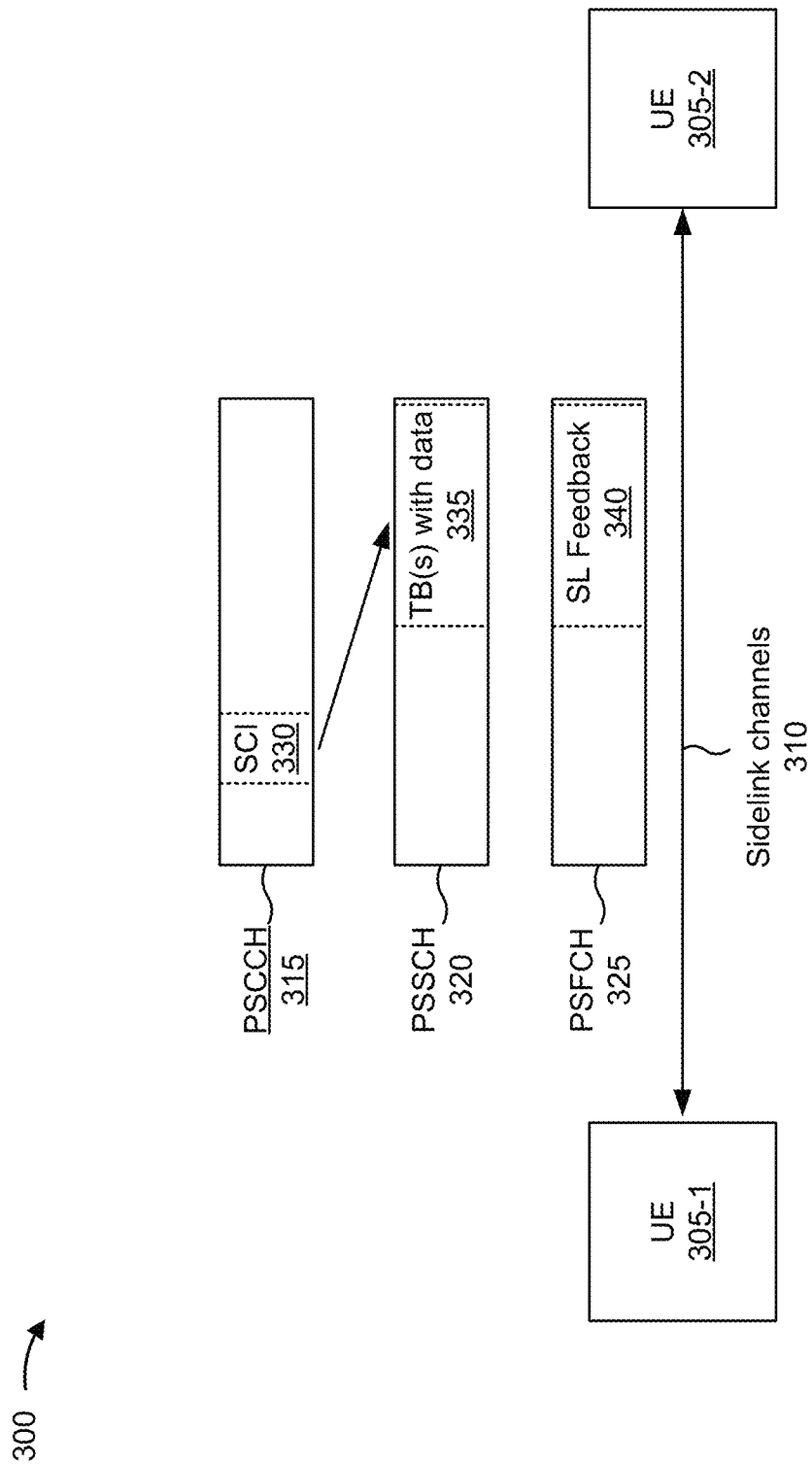
FIG. 3 is a diagram illustrating an aspect of sidelink communications, in accordance with the present disclosure.

FIG. 3 is a diagram illustrating an aspect 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or vehicle to pedestrian (V2P) communications), and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, and/or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. In some aspects, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), and/or a scheduling request (SR).

In some aspects, the one or more sidelink channels 310 may use resource pools. In some aspects, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. In some aspects, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, in some aspects, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an aspect. Other aspects may differ from what is described with respect to FIG. 3.

Figure 4:
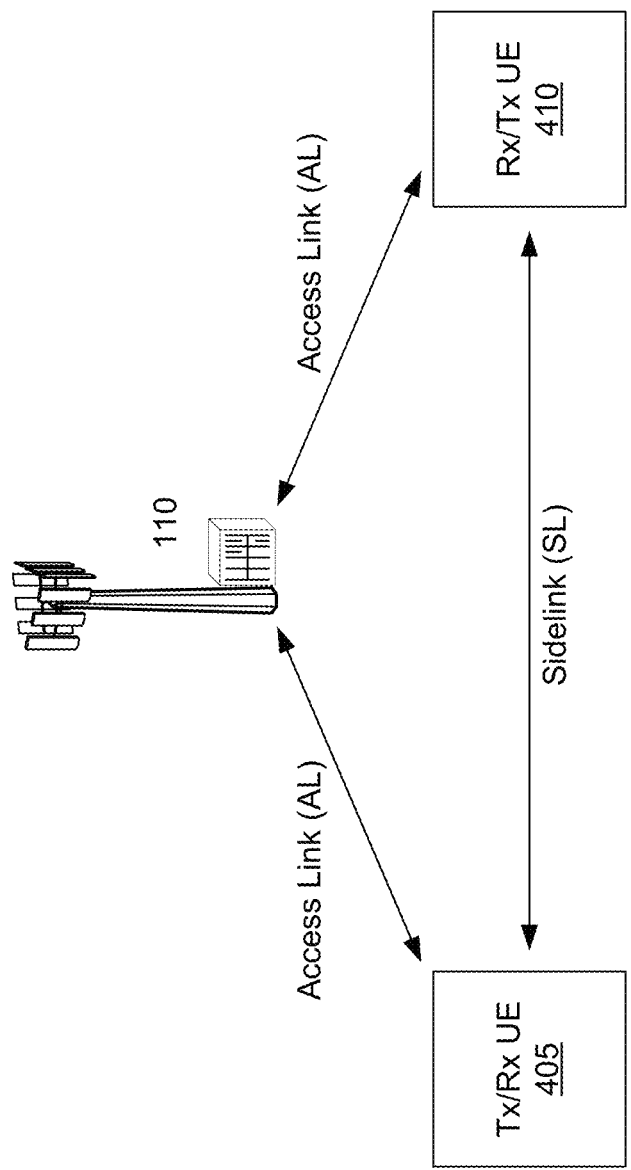
FIG. 4 is a diagram illustrating an aspect of sidelink communications and access link communications, in accordance with the present disclosure.

FIG. 4 is a diagram illustrating an aspect 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (e.g., from a base station 110 to a UE 120) or an uplink communication (e.g., from a UE 120 to a base station 110).

As indicated above, FIG. 4 is provided as an aspect. Other aspects may differ from what is described with respect to FIG. 4.

Figure 5:
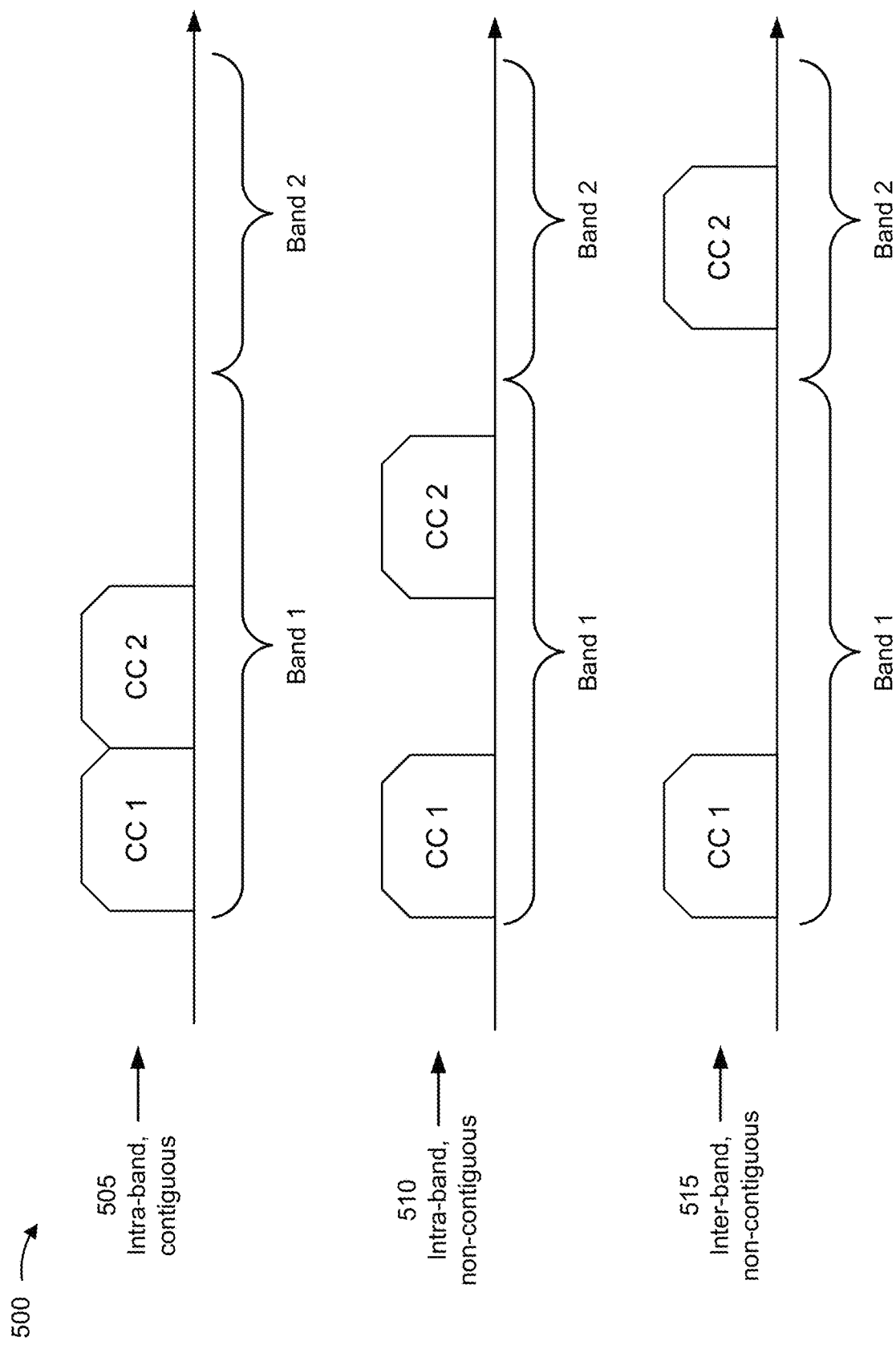
FIG. 5 is a diagram illustrating aspects of carrier aggregation, in accordance with the present disclosure.

FIG. 5 is a diagram illustrating aspects 500 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in a radio resource control (RRC) message, or in downlink control information (DCI).

As shown by reference number 505, in some aspects, carrier aggregation may be configured in an intra-band contiguous mode where the aggregated carriers are contiguous to one another and are in the same band. As shown by reference number 510, in some aspects, carrier aggregation may be configured in an intra-band non-contiguous mode where the aggregated carriers are non-contiguous to one another and are in the same band. As shown by reference number 515, in some aspects, carrier aggregation may be configured in an inter-band non-contiguous mode where the aggregated carriers are non-contiguous to one another and are in different bands.

In carrier aggregation, a UE 120 may be configured with a primary carrier and one or more secondary carriers. In some aspects, the primary carrier may carry control information (e.g., downlink control information, and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

As indicated above, FIG. 5 is provided as an aspect. Other aspects may differ from what is described with regard to FIG. 5.

Figure 6:
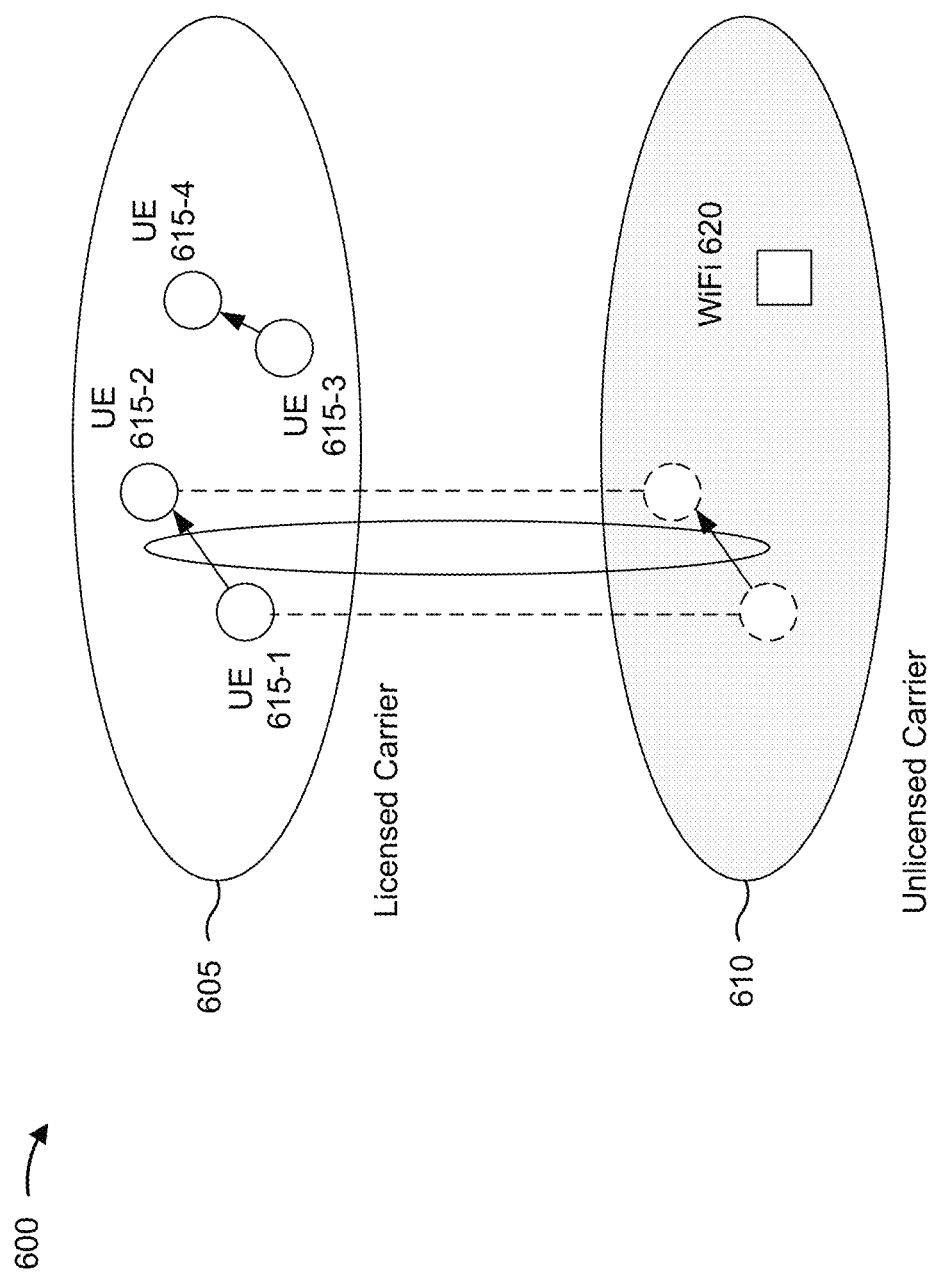
FIG. 6 is a diagram illustrating an aspect of sidelink access with a licensed carrier and an unlicensed carrier, in accordance with the present disclosure.

FIG. 6 is a diagram illustrating an aspect 600 of sidelink access with a licensed carrier 605 and an unlicensed carrier 610, in accordance with the present disclosure. As shown in FIG. 6, UEs 615 (e.g., UE 615-1, UE 615-2, UE 615-3, and/or UE 615-4) may communicate with one another at various times using a sidelink communication (also referred to as sidelink access or simply sidelink) via the licensed carrier 605. Such sidelink communication may occur in the presence of the unlicensed carrier 610, which may co-exist with other RATs. In some aspects, one RAT which may exist in the unlicensed carrier 610 is a WiFi network, and the WiFi network may have a device, e.g., WiFi device 620, operating in the unlicensed carrier 610.

At various times, certain UE devices may be communicating with one another via sidelink. In some aspects, during a given time as shown, UE 615-1 may be in sidelink communication with UE 615-2, and UE 615-3 may be in sidelink communication with UE 615-4. Such sidelink communications may occur without involvement of a base station. For example, such UEs may be in radio resource allocation (RRA) mode 2 sidelink communication allowing standalone deployment of UEs in which the UEs may sense to occupy and reserve channel access (as opposed to RRA mode 1 sidelink communication in which network control is used and UEs receive grants, e.g., from gNB, for channel access).

Scheduling access to licensed spectrum, e.g., the licensed carrier 605, for such sidelink communication between devices is performed efficiently. Presently, sidelink is used predominantly in the V2X domain. As sidelink use cases evolve in vertical domains other than the V2X domain, ever growing amounts of data transfer will present an increasing burden to the licensed spectrum. Off-loading of data to unlicensed spectrum, e.g., the unlicensed carrier 610, is seen as one way to address the data bandwidth limitations of the licensed spectrum. However, scheduling access to unlicensed spectrum for sidelink communications is not as efficient as scheduling access to licensed spectrum for sidelink communications. The terms licensed spectrum, licensed band, and licensed bands may be used interchangeably. Likewise, the terms unlicensed spectrum, unlicensed band, and unlicensed bands may be used interchangeably.

Some techniques and apparatuses described herein may improve access to unlicensed spectrum for sidelink communications by using an indication, via licensed spectrum, of multiple data channels for the sidelink via unlicensed spectrum. Some techniques and apparatuses described herein may use a load based equipment (LBE) technique for determining such access to unlicensed spectrum (as opposed to a frame based equipment (FBE) technique). LBE is a listen-before-talk (LBT) technique. LBT generally allows communications of devices to co-exist on a data channel without previous coordination. LBE is an LBT technique which allows devices to sense availability of a data channel at any time (as opposed to FBE, which is an LBT technique in which devices may sense availability of a data channel at predetermined times). As a result, by using an indication, via licensed spectrum, of multiple data channels for a sidelink communication via unlicensed spectrum, increased spectrum may be made efficiently available to UEs for sidelink access with greater robustness. By using the LBE technique for data channel access into the unlicensed spectrum, complexity and/or overhead associated with stricter synchronizations and/or timings may be avoided. Power savings benefits in channel access may be achieved over the unlicensed carrier, such as by limiting the need to conduct sensing.

As indicated above, FIG. 6 is provided as an aspect. Other aspects may differ from what is described with regard to FIG. 6.

Figure 7:
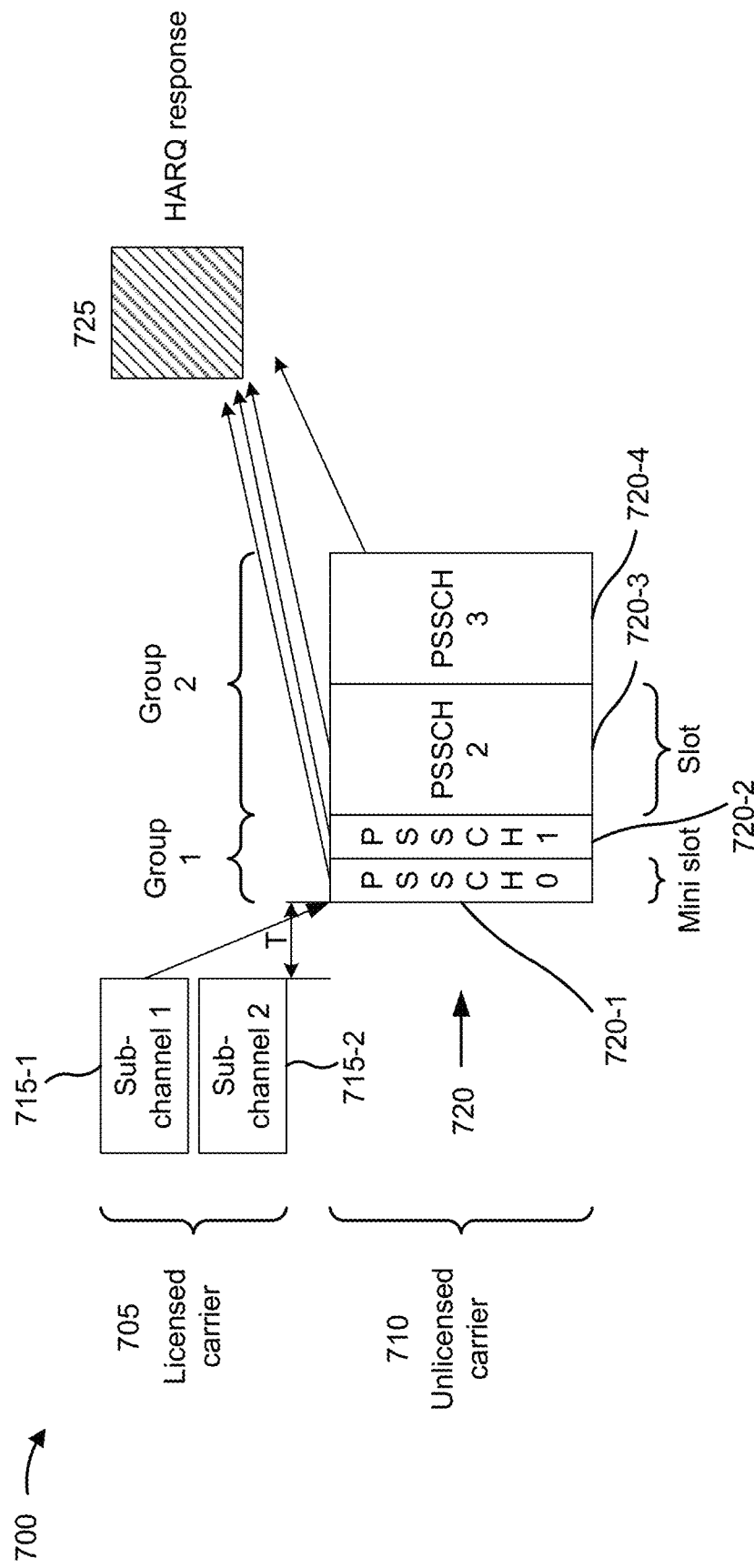
FIG. 7 is a diagram illustrating an aspect associated with licensed assisted sidelink access using an indication of multiple data channels, in accordance with the present disclosure.

FIG. 7 is a diagram illustrating an aspect 700 associated with licensed assisted sidelink access using an indication of multiple data channels, in accordance with the present disclosure. As shown in FIG. 7, a first UE may transmit to a second UE via a sidelink sub-channel, e.g., sub-channel 715-1, of a licensed carrier 705. The first and/or second UEs may correspond to one or more other UEs described elsewhere herein, such as UE 120. The sidelink sub-channel may provide sidelink communication between UEs as described elsewhere herein, such as the sidelink access as described with respect to the UEs 305-1 and 305-2. The licensed carrier 705 may include licensed spectrum and/or licensed bands as described elsewhere herein, such as the licensed carrier 605.

The first UE may transmit to the second UE an indication of multiple data channels 720 (e.g., channel 720-1, channel 720-2, channel 720-3, and/or channel 720-4) of an unlicensed carrier 710. Such multiple data channels 720 may be used to attempt one or more sidelink communications between the first UE and the second UE. The multiple data channels 720 may include PSSCHs, such as the PSSCH 320 described elsewhere herein. In some aspects, the unlicensed carrier 710 may include unlicensed spectrum and/or unlicensed bands as described elsewhere herein, such as the unlicensed carrier 610. The one or more sidelink communications between the first UE and the second UE may be attempted using one or more of the multiple data channels 720. The multiple data channels 720 may be contiguous, or share a common border, back to back in time. By making the multiple data channels 720 contiguous, overall latency may be minimized.

When attempting a sidelink communication, a UE (e.g., the first UE or the second UE) may perform an LBT procedure to determine availability of a data channel and transmit via the data channel if available or perform another LBT procedure on another data channel if the data channel is unavailable. When attempting a sidelink communication, a UE (e.g., the first UE or the second UE) may monitor for a communication on a data channel and, if found, decode such communication. To monitor for a communication, the UE may perform blind decoding in situations where SCI may not be available.

The licensed carrier 705 may be used for Quality of Service (QoS) sensitive data and/or control, while the unlicensed carrier 710 may be used opportunistically to provide a larger data transfer pipeline which may include a relaxed QoS. In this way, licensed assisted QoS and/or congestion control for channel access may be provided over the unlicensed carrier.

The indication transmitted from the first UE to the second UE may identify one or more resources of the licensed carrier 705 to be used for HARQ feedback 725 corresponding to the multiple data channels 720 of the unlicensed carrier 710. Providing the HARQ feedback 725 via the licensed carrier 705 (as opposed to the unlicensed carrier 710) may provide improved reliability. With the HARQ feedback 725 provided through the licensed carrier 705 (as opposed to the unlicensed carrier 710), highly reliable control signaling may be provided.

The indication transmitted from the first UE to the second UE may include one or more transmission parameters for respective ones of the multiple data channels 720. The one or more transmission parameters may include one or more carrier frequency indications (CFIs) for the multiple data channels 720, one or more bandwidth part (BWP) indicators for the multiple data channels 720, one or more transmission configuration indicator (TCI) states for the multiple data channels 720, one or more time domain resource allocations (TDRAs) for the multiple data channels 720, one or more frequency domain resource allocations (FDRAs) for the multiple data channels 720, one or more MCSs for the multiple data channels 720, one or more HARQ parameters for the multiple data channels 720, one or more sounding reference signal resource indicators (SRIs) for the multiple data channels 720, or a combination thereof. The HARQ parameters may include one or more new data indicator (NDI) parameters and/or one or more redundancy version (RV) parameters. NDI parameters may be used for determination of sending new data. RV parameters may be used for determination of transmission characteristics.

As shown in FIG. 7, in some aspects, the multiple data channels 720 may be grouped into one or more groups (e.g., Group 1 and/or Group 2). One or more data channels included in a same group (e.g., PSSCH0 and PSSCH1 in Group 1, and/or PSSCH2 and PSSCH3 in Group 2) may be associated with one or more common transmission parameters for the group, such as one or more of the transmission parameters listed above. Configuring data channels included in a same group with common transmission parameters may save signaling overhead and/or bandwidth relating to indicating transmission parameters for the data channels.

Data channels of the multiple data channels 720 may occupy time slots. Such slots may be of greater duration, such as PSSCH2 being a slot of greater duration in Group 2, or of lesser duration, such as PSSCH0 being a slot of lesser duration in Group 1, as shown in FIG. 7. A slot of lesser duration may be referred to as a mini-slot. The multiple data channels 720 may start with one or more mini-slots, such as PSSCH0 and PSSCH1, occupying mini-slots in Group 1. Providing such mini-slots at the beginning of a train of multiple data channels 720 may reduce latency, such as in the event an initial LBT procedure is unable to access a data channel, perhaps due to congestion and/or interference, and another LBT procedure is to be attempted. In this way, mini-slots may provide multiple opportunities to obtain access to a data channel, which multiple opportunities may reduce latency in a sidelink communication.

In some aspects, the indication transmitted from the first UE to the second UE may be included in SCI, a medium access control (MAC) control element (CE) (MAC-CE), a radio resource control configuration message, or a combination thereof. For SCI, the indication may be included in a new SCI, e.g., a stage two sidelink control information (SCI-2).

Ensuring validity of a sidelink communication may be useful for avoiding undesirable communication. The indication transmitted from the first UE to the second UE may be determined to be valid once a handshaking procedure is completed. In some aspects, such as with a MAC-CE or another upper-layer communication, two-way handshaking may be used for added reliability in determining validity of the communication. For even greater reliability in determining validity of the communication, three-way handshaking may be used. The indication may be determined valid based at least in part on the handshaking procedure, in which case the indication may be used by the second UE (receiver). The indication may be used to arrange periodic communications, similar to a configured grant.

To allow the second UE (receiver) time to access the unlicensed carrier 710, a delay or time gap may be added following transmission of the indication by the first UE (transmitter), but before the multiple data channels 720 are present on the unlicensed carrier 710. The indication transmitted from the first UE to the second UE, and an initial data channel of the multiple data channels 720, may be separated by a non-zero time gap, shown as "T" in FIG. 7. The time gap T may be present to provide a predetermined delay between the end of a slot where the indication was transmitted and the beginning of a first data channel of the multiple data channels 720.

The indication transmitted from the first UE to the second UE may indicate that SCI is to be transmitted using one or more data channels of the multiple data channels 720. To permit other UEs to read and avoid collision with the sidelink communication, and better co-exist in the unlicensed carrier 710, the first UE may transmit stage one sidelink control information (SCI-1) over the multiple data channels 720. In some aspects, the SCI-1 may appear in any slot of the multiple data channels 720; the SCI-1 may appear once in any given slot; and/or the SCI-1 may appear at the beginning of the multiple data channels 720, e.g., an initial slot. Transmitting SCI-1 over the multiple data channels 720, using the unlicensed carrier 710, may provide an indication of occupancy of resources in the unlicensed carrier 710 such that another standalone sidelink system may read and avoid collision. A predetermined bit may be assigned to indicate the sidelink transmitter is to insert an SCI-1 in one of the data channels in the train. The predetermined bit may be used by stand-alone sidelink UEs to determine occupancy of resources.

The second UE may receive, from the first UE via the sidelink sub-channel, e.g., sub-channel 715-1, of licensed carrier 705, the indication of multiple data channels 720 (e.g., channel 720-1, channel 720-2, channel 720-3, and/or channel 720-4) of unlicensed carrier 710. Such indication may be used to attempt one or more sidelink communications between the second UE and the first UE. The one or more sidelink communications between the second UE and the first UE may be attempted using one or more of the multiple data channels 720.

As described above, licensed assisted sidelink access may be performed using an indication of multiple data channels on an unlicensed carrier. In this way, robustness of sidelink communication may be improved by better allowing communications of other radio access technologies, such as WiFi communications, to co-exist with the sidelink communication on the unlicensed spectrum.

As indicated above, FIG. 7 is provided as an aspect. Other aspects may differ from what is described with regard to FIG. 7.

Figure 8:
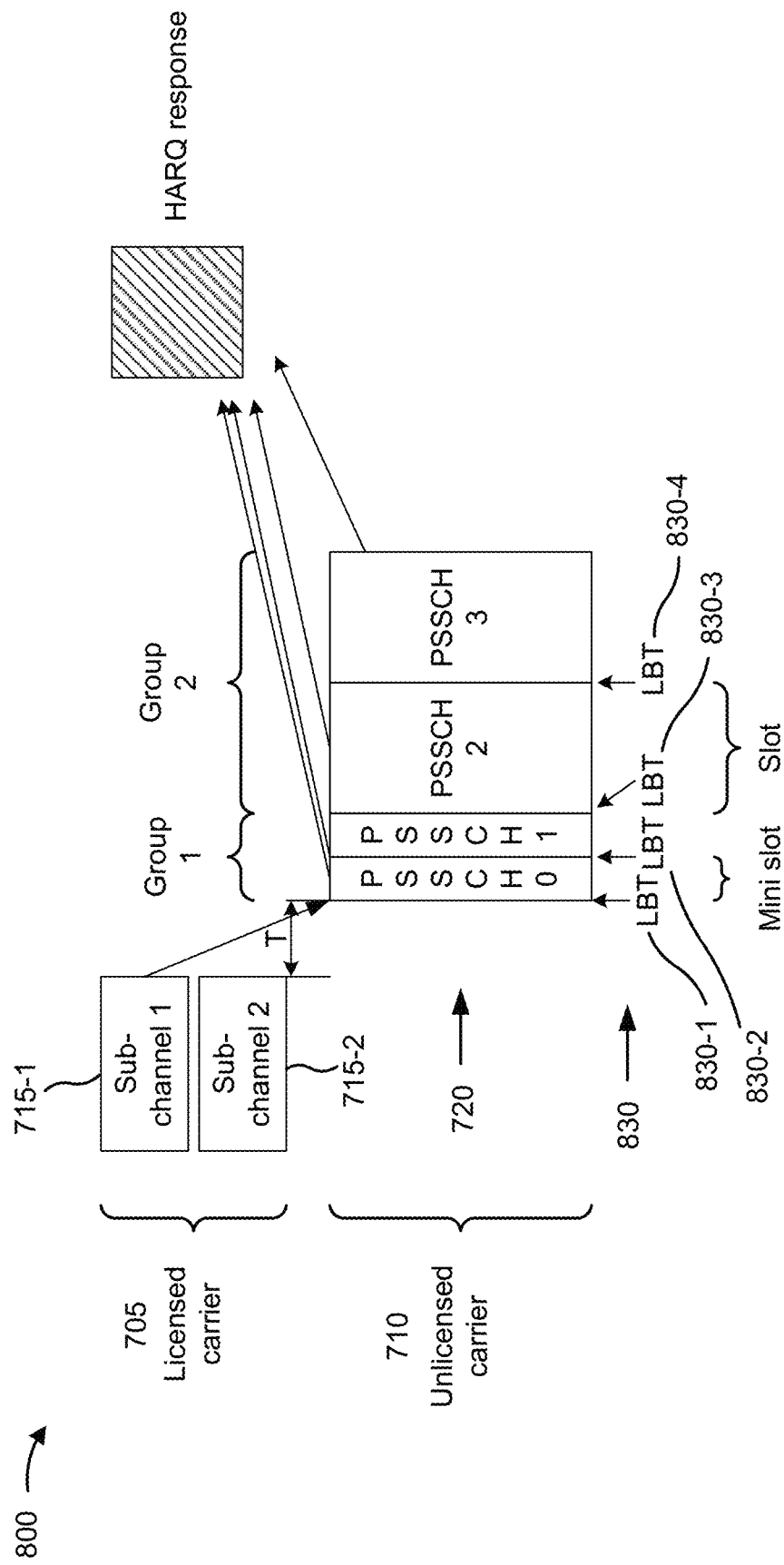
FIG. 8 is a diagram illustrating an aspect associated with licensed assisted sidelink access using an indication of multiple data channels with listen-before-talk (LBT), in accordance with the present disclosure.

FIG. 8 is a diagram illustrating an aspect 800 associated with licensed assisted sidelink access using an indication of multiple data channels with LBT, in accordance with the present disclosure. As shown in FIG. 8, a first UE may transmit to a second UE via a sidelink sub-channel, e.g., sub-channel 715-1, of a licensed carrier 705. The first and/or second UEs may correspond to one or more other UEs described elsewhere herein, such as UE 120. The sidelink sub-channel may provide sidelink communication between UEs as described elsewhere herein, such as the sidelink access as described with respect to the UEs 305-1 and 305-2. The licensed carrier 705 may include licensed spectrum and/or licensed bands as described elsewhere herein, such as the licensed carrier 605.

The first UE may transmit to the second UE an indication of multiple data channels 720 of an unlicensed carrier 710. Such multiple data channels 720 may be used to attempt one or more sidelink communications between the first UE and the second UE. The multiple data channels 720 may include PSSCHs, such as the PSSCH 320 described elsewhere herein. In some aspects, the unlicensed carrier 710 may include unlicensed spectrum and/or unlicensed bands as described elsewhere herein, such as the unlicensed carrier 610. The one or more sidelink communications between the first UE and the second UE may be attempted using one or more of the multiple data channels 720.

As described above with respect to FIG. 7, LBT generally allows communications of devices to co-exist on a data channel, without previous coordination, by determining availability of a data channel and transmitting via such data channel if available (or performing another LBT procedure on another data channel if unavailable). The first UE (transmitter) may perform an LBT procedure to determine availability of a data channel, and selectively transmit a sidelink communication to the second UE (receiver) using the data channel based at least in part on the determined availability of the data channel. For improved sidelink communications between the first UE and the second UE, one or more LBT procedures may be performed in connection with data channels of the multiple data channels 720.

As shown in FIG. 8, the first UE (transmitter) may perform one or more LBT procedures 830 (e.g., LBT procedure 830-1, LBT procedure 830-2, LBT procedure 830-3, and/or LBT procedure 830-4) before transmitting on a data channel. In particular, the first UE may perform an LBT procedure 830 for a given data channel of the multiple data channels, such as the multiple data channels 720, before the first UE attempts to transmit a sidelink communication on the given data channel. If the first UE determines that the data channel is available, e.g., based at least in part on sensing during the LBT procedure, the first UE may selectively transmit the sidelink communication via the data channel. If the first UE is unable to determine that the data channel is available, based at least in part on sensing during the LBT procedure, the first UE may perform a subsequent LBT procedure for a next data channel of the multiple data channels. The first UE may then perform an LBT procedure 830 on the next data channel, in similar fashion to the previous data channel, with the process repeating for determining availability of a data channel.

As shown in FIG. 8, the first UE may perform a first LBT procedure 830-1 for a first data channel, e.g., PSSCH0, of the multiple data channels for attempting a sidelink communication. If the first UE is able to determine that the first data channel is available via the first LBT procedure 830-1, the first UE may selectively transmit the sidelink communication via the first data channel, e.g., PSSCH0, to the second UE (receiver). If the first UE is unable to determine availability of the data channel via the first LBT procedure 830-1, the first UE may perform a second LBT procedure 830-2 for a second data channel, e.g., PSSCH1, of the multiple data channels in similar fashion to the previous data channel, with the process repeating to determine availability of a data channel.

For improved error handling, when performing the first LBT procedure 830-1, the first UE may use a cyclic prefix (CP) extension. By using a CP extension, the first UE may occupy the data channel earlier, such as up to one OFDM symbol before the specified starting point of the first data channel. The first UE may then communicate using the data channel, e.g., PSSCH, based at least in part on indicated TDRAs which may be specified for the data channel.

While a transmitting UE may perform an LBT procedure before attempting the sidelink communication, a receiving UE may perform blind decoding for a data channel for receiving the sidelink communication. As discussed above with respect to FIG. 7, with blind decoding, SCI may not be available. The second UE (receiver) may attempt to receive the sidelink communication from the first UE (transmitter), without SCI, based at least in part on the indication from the first UE.

To further improve decoding, the second UE (receiver) may monitor for a reference signal, e.g., a DMRS sequence, according to a given threshold. The second UE may use the threshold to monitor for the reference signal, at a predetermined port, for the sidelink communication to initiate decoding of the data channel. The threshold may be relatively lower (stricter) for an earlier data channel, such as before a first cyclic redundancy check (CRC) process completes. The threshold may be relatively higher (relaxed) for a later data channel, such as after the first CRC process completes. For CRC processes, the second UE (receiver) may receive a HARQ response (acknowledgment (ACK) and/or negative acknowledgment (NACK)) reflecting an outcome of the CRC process.

As indicated above, FIG. 8 is provided as an aspect. Other aspects may differ from what is described with regard to FIG. 8.

Figure 9:
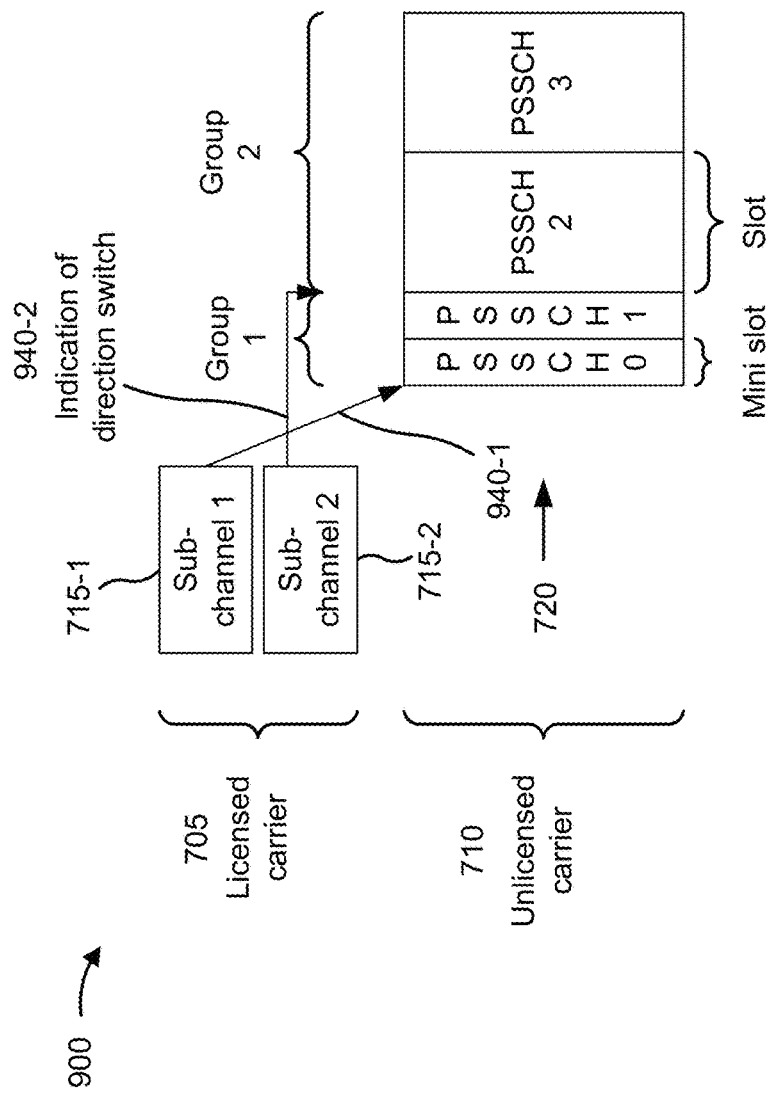
FIG. 9 is a diagram illustrating an aspect associated with licensed assisted sidelink access using an indication of multiple data channels with direction indication and direction switching, in accordance with the present disclosure.

FIG. 9 is a diagram illustrating an aspect 900 associated with licensed assisted sidelink access using an indication of multiple data channels with direction indication and direction switching, in accordance with the present disclosure. As shown in FIG. 9, a first UE may transmit to a second UE via a sidelink sub-channel, e.g., sub-channel 715-1, of a licensed carrier 705. The first and/or second UEs may correspond to one or more other UEs described elsewhere herein, such as UE 120. The sidelink sub-channel may provide sidelink communication between UEs as described elsewhere herein, such as the sidelink access as described with respect to the UEs 305-1 and 305-2. The licensed carrier 705 may include licensed spectrum and/or licensed bands as described elsewhere herein, such as the licensed carrier 605.

The first UE may transmit to the second UE an indication of multiple data channels 720 of an unlicensed carrier 710. Such multiple data channels 720 may be used to attempt one or more sidelink communications between the first UE and the second UE. The multiple data channels 720 may include PSSCHs, such as the PSSCH 320 described elsewhere herein. In some aspects, the unlicensed carrier 710 may include unlicensed spectrum and/or unlicensed bands as described elsewhere herein, such as the unlicensed carrier 610. The one or more sidelink communications between the first UE and the second UE may be attempted using one or more of the multiple data channels 720.

For improved data flow between the first UE and the second UE, the multiple data channels 720 may include one or more traffic direction indications for indicating a direction of data for a given data channel of the multiple data channels 720, e.g., from the first UE to the second UE, or from the second UE to the first UE. Such direction indications may at times indicate a switch in direction.

As shown in FIG. 9, the first UE may communicate a first traffic direction indication 940-1 indicating transmission of data from the first UE to the second UE using the first and second data channels of the multiple data channels 720, e.g., PSSCH0 and PSSCH1 (Group 1). The first UE may communicate the first traffic direction indication 940-1 on the sub-channel 715-1. The second UE may communicate a second traffic direction indication 940-2 indicating a switch in traffic direction. The second UE may communicate the second traffic direction indication 940-2 indicating transmission of data from the second UE to the first UE using the third and fourth data channels of the multiple data channels 720, e.g., PSSCH2 and PSSCH3 (Group 2). The second UE may communicate the second traffic direction indication 940-2 on the sub-channel 715-2.

Although direction switching is shown in FIG. 9 occurring between groups, such direction switching may occur following any individual data channel. In some aspects, one or more direction switches may occur within a group. By allowing one or more traffic direction indications at various points with respect to the data channels, the first UE and the second UE may flexibly communicate in either direction with one another. Allowing such flexibility in communication may improve efficiency of communication on the unlicensed carrier 710.

While different data channels of the multiple data channels may be associated with different data directions as described above, all of the data channels of the multiple data channels could be associated with a same data direction, whether from the first UE to the second UE, or from the second UE to the first UE. The first UE could communicate an initial traffic direction indication indicating transmission of data from the first UE to the second UE for all of the data channels, e.g., multiple data channels 720, without any subsequent traffic direction indications occurring. The second UE could communicate an initial traffic direction indication indicating transmission of data from the second UE to the first UE for all of the data channels, e.g., multiple data channels 720, without any subsequent traffic direction indications occurring.

Different parameters may also be configured during changes in traffic direction. A first set of parameters, e.g., MCS, TCI, and/or SRI, could be configured for a first data channel, e.g., PSSCH0, and/or group, e.g., Group 0, associated with the first traffic direction indication 940-1. A second set of parameters, e.g., MCS, TCI, and/or SRI, could be configured for a second data channel, e.g., PSSCH2, and/or group, e.g., Group 1, associated with the second traffic direction indication 940-2. In some aspects, one or more parameters in the first set of parameters have values that match a corresponding one or more parameters in the second set of parameters.

To further support direction switching, an indication of a change in traffic direction between the first UE and the second UE may be associated with an LBT procedure, e.g., LBT procedure 830 of FIG. 8, for determining availability of a channel. The LBT procedure may be a Type 2 LBT procedure for transmission of a sidelink communication in a later data channel, e.g., PSSCH1. To allow a UE (receiver) time to respond to a change in traffic direction, a time gap, e.g., "T," as described above with respect to FIG. 7, may be associated with the LBT procedure and change in traffic direction. For improved error handling, a CP extension, as described above with respect to FIG. 7, may be associated with the LBT procedure and change in traffic direction. A UE may use the CP extension to occupy a channel at an instant earlier than an OFDM symbol boundary might allow. By providing the time gap and/or CP extension with the LBT procedure, channel sharing between UEs, e.g., channel occupancy time (COT), may be improved.

As indicated above, FIG. 9 is provided as an aspect. Other aspects may differ from what is described with regard to FIG. 9.

Figure 10:
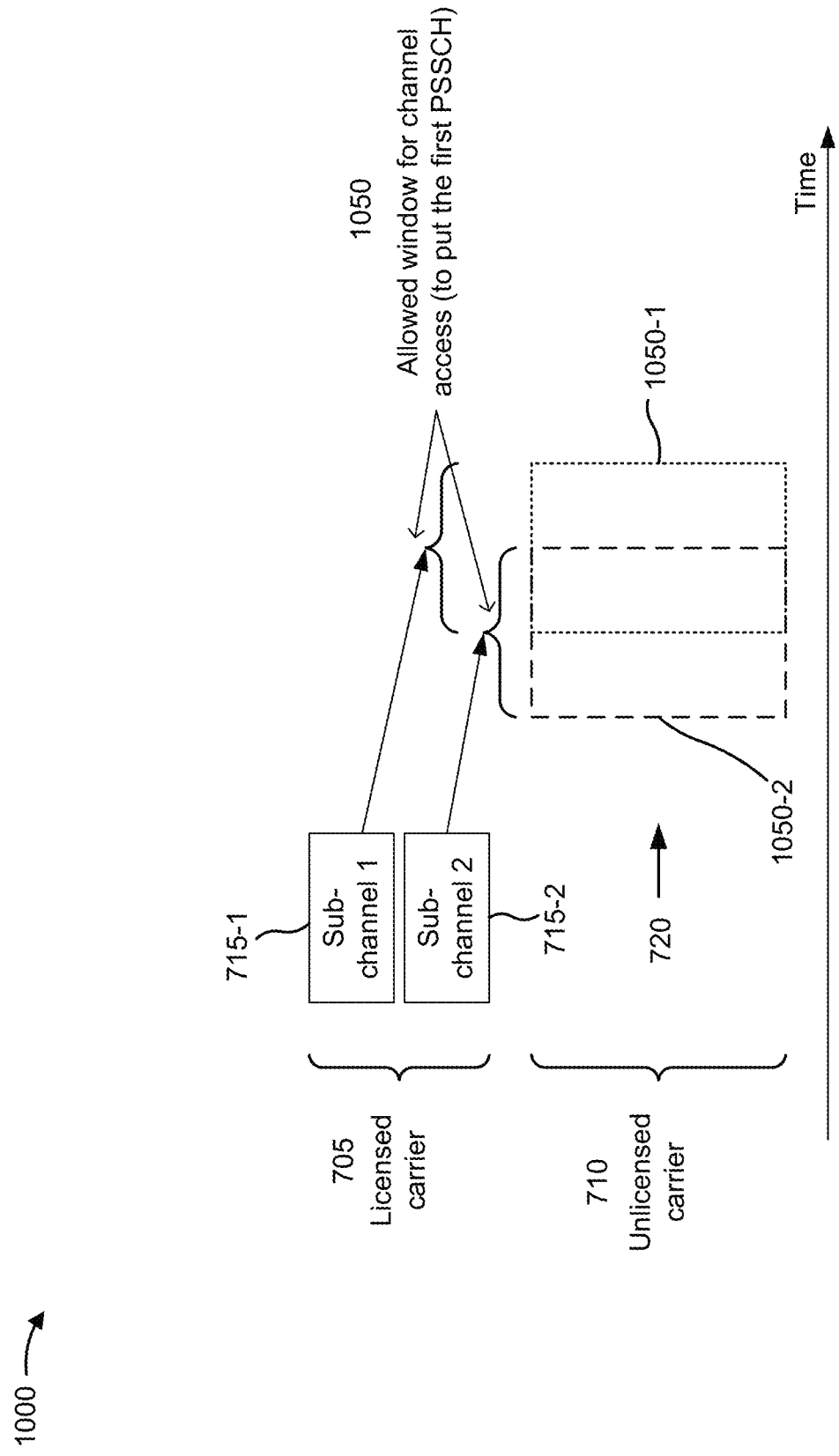
FIG. 10 is a diagram illustrating an aspect associated with licensed assisted sidelink access using an indication of multiple data channels with mapping, in accordance with the present disclosure.

FIG. 10 is a diagram illustrating an aspect 1000 associated with licensed assisted sidelink access using an indication of multiple data channels with mapping, in accordance with the present disclosure. As shown in FIG. 10, a first UE may transmit to a second UE via a sidelink sub-channel, e.g., sub-channel 715-1, of a licensed carrier 705. The first and/or second UEs may correspond to one or more other UEs described elsewhere herein, such as UE 120. The sidelink sub-channel may provide sidelink communication between UEs as described elsewhere herein, such as the sidelink access as described with respect to the UEs 305-1 and 305-2. The licensed carrier 705 may include licensed spectrum and/or licensed bands as described elsewhere herein, such as the licensed carrier 605.

The first UE may transmit to the second UE an indication of multiple data channels 720 of an unlicensed carrier 710. Such multiple data channels 720 may be used to attempt one or more sidelink communications between the first UE and the second UE. The multiple data channels 720 may include PSSCHs, such as the PSSCH 320 described elsewhere herein. In some aspects, the unlicensed carrier 710 may include unlicensed spectrum and/or unlicensed bands as described elsewhere herein, such as the unlicensed carrier 610. The one or more sidelink communications between the first UE and the second UE may be attempted using one or more of the multiple data channels 720.

To manage channel access competition over the unlicensed carrier, e.g., unlicensed carrier 710, and/or avoid collisions, the first UE and the second UE may map to radio access windows (RAWs) for accessing the unlicensed carrier. Such mapping may be associated with the indication described above in connection with FIG. 7.

As shown in FIG. 10, sub-channel, index dependent, RAWs 1050 (first RAW 1050-1 and/or second RAW 1050-2) may be defined by the indication for accessing the unlicensed carrier 710. The sub-channel 715-1 of the licensed carrier 705 may be mapped to the first RAW 1050-1 of the unlicensed carrier 710 (occurring later in time). A given UE, such as the first UE or the second UE, may be associated with the sub-channel 715-1. The sub-channel 715-2 of the licensed carrier 705 may be mapped to the second RAW 1050-2 of the unlicensed carrier 710 (occurring earlier in time). A given UE, such as the first UE or the second UE, may be associated with the sub-channel 715-2. A starting data channel of the multiple data channels, e.g., PSSCH0, may start within the second RAW 1050-2 occurring earlier in time. By mapping the data channels to radio access windows which occur at differing times, licensed assisted collision avoidance for channel access may be provided.

In some aspects, the indication from a UE may randomly select a candidate OFDM symbol within a RAW 1050. Such candidate OFDM may serve as a starting point of the train of data channels, e.g., PSSCH0, determined according to the particular sub-channel on which the indication was sent. Such mapping to RAWs, e.g., mapping pattern, may change at times, on a per slot basis.

As discussed above, RAWs may occur at different times, e.g., the first RAW 1050-1 occurring later in time, and/or the second RAW 1050-2 occurring earlier in time. Allowing RAWs to occur at different times may better avoid competition between sub-channels 715.

To improve the distribution and/or timing between start times of RAWs, a penalty factor may be defined, such as during initial configuration, for use in a channel occupancy calculation between the sub-channels. The sidelink sub-channel with a RAW that is first in time, e.g., the second RAW 1050-2, associated with the sub-channel 715-2, may be associated with a channel access penalty factor that is greater than a channel access penalty factor associated with a sidelink sub-channel with a RAW that is second in time, e.g., the first RAW 1050-1, associated with the sub-channel 715-1. The channel occupancy calculation may be made, with associated penalty factors, for determining optimal start times of RAWs.

To improve congestion of data traffic through the unlicensed carrier 710, the first UE may provide licensed assisted congestion control. In doing so, the first UE may define the unlicensed carrier, e.g., unlicensed carrier 710, as "separate" and "affiliated" for congestion control determination. By "separate," the first UE may be configured to maintain, from the licensed carrier, e.g., licensed carrier 705, separate channel occupancy ratio statuses, separate channel occupancy ratio limits for a same channel busy rate value, or a combination thereof. By "affiliated," the first UE may be configured to use a CBR measurement for the licensed carrier 705 to determine a channel occupancy limit for the unlicensed carrier 710. Additionally, or alternatively, by "affiliated," the first UE may be configured to indicate that a channel occupancy ratio limit for the unlicensed carrier may be calculated based at least in part on the lesser of a first channel busy rate estimate for the licensed carrier 705 and a second channel busy rate estimate for the unlicensed carrier 710. By configuring the first UE to so define the unlicensed carrier as "separate" and "affiliated" for congestion control determination, the first UE may improve congestion of data traffic through the unlicensed carrier.

As indicated above, FIG. 10 is provided as an aspect. Other aspects may differ from what is described with regard to FIG. 10.

Figure 11:
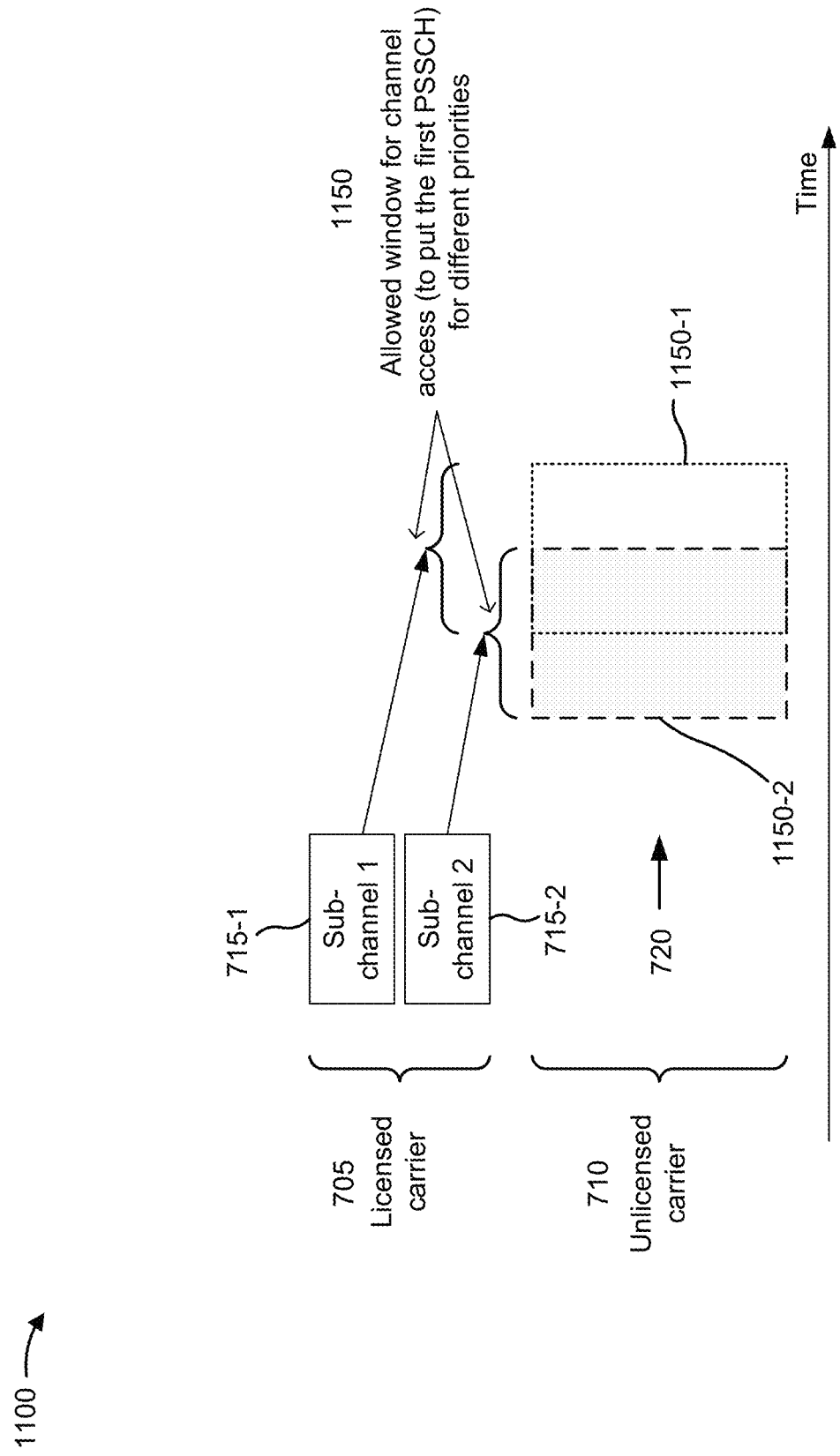
FIG. 11 is a diagram illustrating an aspect associated with licensed assisted sidelink access using an indication of multiple data channels with Quality of Service (QoS), in accordance with the present disclosure.

FIG. 11 is a diagram illustrating an aspect 1100 associated with licensed assisted sidelink access using an indication of multiple data channels with QoS, in accordance with the present disclosure. As shown in FIG. 11, a first UE may transmit to a second UE via a sidelink sub-channel, e.g., sub-channel 715-1, of a licensed carrier 705. The first and/or second UEs may correspond to one or more other UEs described elsewhere herein, such as UE 120. The sidelink sub-channel may provide sidelink communication between UEs as described elsewhere herein, such as the sidelink access as described with respect to the UEs 305-1 and 305-2. The licensed carrier 705 may include licensed spectrum and/or licensed bands as described elsewhere herein, such as the licensed carrier 605.

The first UE may transmit to the second UE an indication of multiple data channels 720 of an unlicensed carrier 710. Such multiple data channels 720 may be used to attempt one or more sidelink communications between the first UE and the second UE. The multiple data channels 720 may include PSSCHs, such as the PSSCH 320 described elsewhere herein. In some aspects, the unlicensed carrier 710 may include unlicensed spectrum and/or unlicensed bands as described elsewhere herein, such as the unlicensed carrier 610. The one or more sidelink communications between the first UE and the second UE may be attempted using one or more of the multiple data channels 720.

To improve performance through the unlicensed carrier 710, the first UE and/or the second UE may support QoS associated with the one or more sidelink communications between the first UE and the second UE. As discussed above with respect to FIG. 10, multiple RAWs may be used over the unlicensed carrier, e.g., unlicensed carrier 710, to manage channel access competition and/or avoid collisions. Such RAWs may be configured to occur at different starting points which may reflect different prioritizations for QoS. In particular, a first UE (transmitter) may provide QoS by starting a first RAW before a second RAW, thereby prioritizing the first RAW over the second RAW.

As shown in FIG. 11, to improve QoS, multiple RAWs 1150 may be provided with different starting points according to different QoS priorities. In particular, RAW 1150-2 in the unlicensed carrier, associated with the sub-channel 715-2, may have an earlier starting point than RAW 1150-1 in the unlicensed carrier 710, associated with the sub-channel 715-1. By prioritizing the sub-channel 715-2 earlier in time, the sub-channel 715-2 may be associated with a higher QoS priority than the sub-channel 715-1.

Configurations of the multiple RAWs 1150 may be different from one another. The RAW 1150-1 may be associated with a different range of CP extensions and/or a different number of mini-slots for the multiple data channels, e.g., multiple data channels 720, than the RAW 1150-2. A higher priority communication may extend a CP extension, e.g., by an additional OFDM symbol, while a lower priority communication might not use a CP extension at all. Additionally, or alternatively, a higher priority communication may extend mini-slot channels, e.g., PSSCHs, such as up to seven mini-slot channels, while a lower priority communication may have zero mini-slot channels. By allowing configurations of the RAWs to be different from one another, performance through the unlicensed carrier 710 may be improved.

As indicated above, FIG. 11 is provided as an aspect. Other aspects may differ from what is described with regard to FIG. 11.

Figure 12:
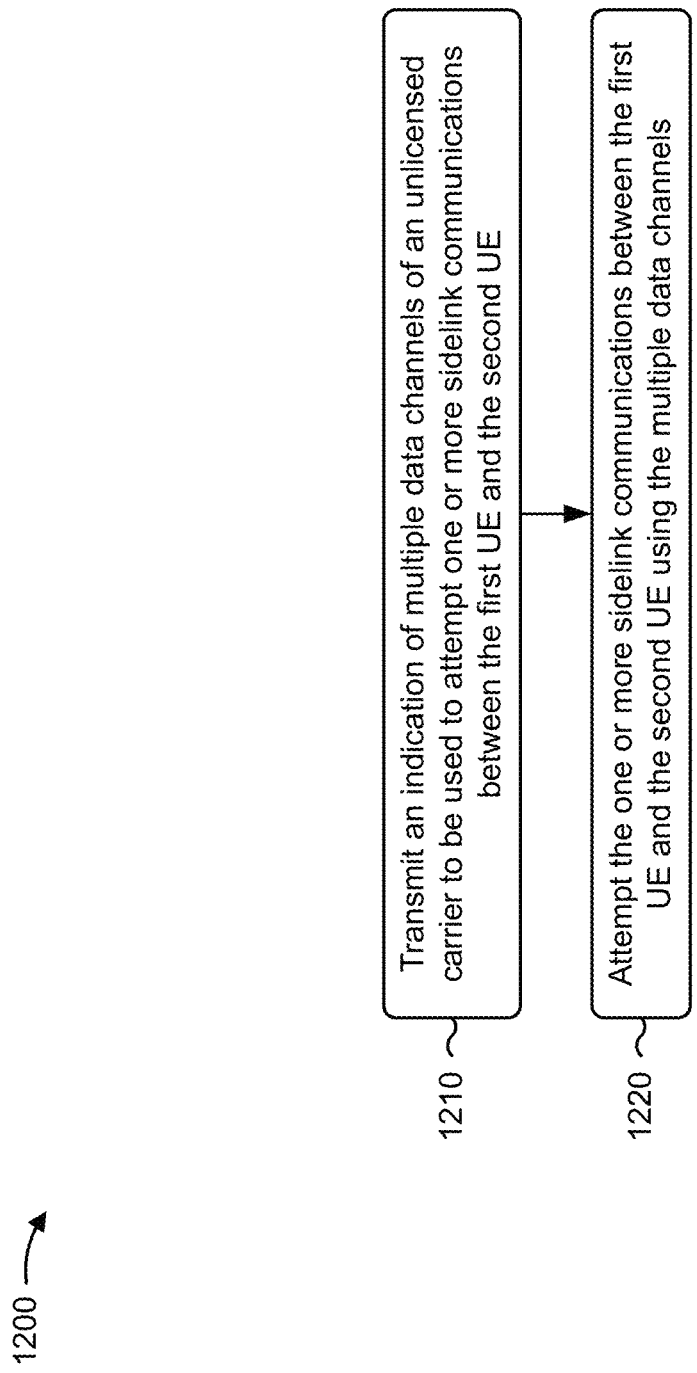
FIGS. 12-13 are diagrams illustrating aspect processes associated with licensed assisted sidelink access using an indication of multiple data channels, in accordance with the present disclosure.

FIG. 12 is a diagram illustrating an example process 1200 performed, for example, by a first UE, in accordance with the present disclosure. Example process 1200 is an example where the first UE (e.g., UE 120) performs operations associated with licensed assisted sidelink access using an indication of multiple data channels.

As shown in FIG. 12, in some aspects, process 1200 may include transmitting, to a second UE via a sidelink sub-channel of a licensed carrier, an indication of multiple data channels of an unlicensed carrier to be used to attempt one or more sidelink communications between the first UE and the second UE (block 1210). For example, the first UE (e.g., using transmit processor 264, controller/processor 280, and/or memory 282) may transmit, to a second UE via a sidelink sub-channel of a licensed carrier, an indication of multiple data channels of an unlicensed carrier to be used to attempt one or more sidelink communications between the first UE and the second UE, as described above.

As further shown in FIG. 12, in some aspects, process 1200 may include attempting the one or more sidelink communications between the first UE and the second UE using the multiple data channels (block 1220). For example, the first UE (e.g., using receive processor 258, transmit processor 264, controller/processor 280, and/or memory 282) may attempt the one or more sidelink communications between the first UE and the second UE using the multiple data channels, as described above.

Process 1200 may include additional aspects, such as any single aspect or any combination of aspects described below and/or in connection with one or more other processes described elsewhere herein.

In a first aspect, the multiple data channels are contiguous.

In a second aspect, alone or in combination with the first aspect, the indication identifies one or more resources of the licensed carrier to be used for hybrid automatic repeat request feedback corresponding to the multiple data channels.

In a third aspect, alone or in combination with one or more of the first and second aspects, the indication includes one or more transmission parameters for the multiple data channels, wherein the one or more transmission parameters include one or more carrier frequency indications for the multiple data channels, one or more bandwidth part indicators for the multiple data channels, one or more transmission configuration indicator states for the multiple data channels, one or more time domain resource allocations for the multiple data channels, one or more frequency domain resource allocations for the multiple data channels, one or more modulation and coding schemes for the multiple data channels, one or more hybrid automatic repeat request parameters for the multiple data channels, one or more sounding reference signal resource indicators for the multiple data channels, or a combination thereof.

In a fourth aspect, alone or in combination with one or more of the first through third aspects, the multiple data channels are grouped into multiple groups, and wherein data channels included in a same group are associated with one or more common transmission parameters.

In a fifth aspect, alone or in combination with one or more of the first through fourth aspects, the multiple data channels start with one or more mini-slot-based data channels.

In a sixth aspect, alone or in combination with one or more of the first through fifth aspects, the indication is included in sidelink control information, a MAC-CE, a radio resource control configuration message, or a combination thereof.

In a seventh aspect, alone or in combination with one or more of the first through sixth aspects, the indication identifies a traffic direction for the multiple data channels, wherein the traffic direction is from the first UE to the second UE or from the second UE to the first UE.

In an eighth aspect, alone or in combination with one or more of the first through seventh aspects, the indication identifies a switch in traffic direction between a first set of data channels, of the multiple data channels, and a second set of data channels of the multiple data channels.

In a ninth aspect, alone or in combination with one or more of the first through eighth aspects, the indication identifies at least one of a time gap or a cyclic prefix extension for a listen-before-talk procedure associated with the switch in traffic direction.

In a tenth aspect, alone or in combination with one or more of the first through ninth aspects, attempting the one or more sidelink communications comprises performing a Type 2 listen-before-talk procedure for transmission of a sidelink communication in a later data channel, of the multiple data channels, after successful reception of a sidelink communication in an earlier data channel of the multiple data channels.

In an eleventh aspect, alone or in combination with one or more of the first through tenth aspects, attempting the one or more sidelink communications comprises performing a first listen-before-talk procedure for a first data channel, of the multiple data channels, in which the first UE is to attempt to transmit a sidelink communication to the second UE, and selectively transmitting the sidelink communication via the first data channel or performing a second listen-before-talk procedure for a second data channel, of the multiple data channels, based at least in part on whether the first listen-before-talk procedure succeeds.

In a twelfth aspect, alone or in combination with one or more of the first through eleventh aspects, attempting the one or more sidelink communications comprises performing blind decoding for a data channel, of the multiple data channels, in which the first UE is to attempt to receive a sidelink communication from the second UE based at least in part on the indication.

In a thirteenth aspect, alone or in combination with one or more of the first through twelfth aspects, the indication and an initial data channel, of the multiple data channels, are separated by a time gap.

In a fourteenth aspect, alone or in combination with one or more of the first through thirteenth aspects, the sidelink sub-channel of the licensed carrier is mapped to an access window associated with the unlicensed carrier, and wherein a starting data channel of the multiple data channels starts within the access window.

In a fifteenth aspect, alone or in combination with one or more of the first through fourteenth aspects, a first sidelink sub-channel of the licensed carrier is associated with a first access window in the unlicensed carrier that has an earlier starting time than a second access window in the unlicensed carrier associated with a second sidelink sub-channel of the licensed carrier, and wherein the first sidelink sub-channel is associated with a channel access penalty factor that is greater than a channel access penalty factor associated with the second sidelink sub-channel.

In a sixteenth aspect, alone or in combination with one or more of the first through fifteenth aspects, a first sidelink sub-channel of the licensed carrier is associated with a first access window in the unlicensed carrier that has an earlier starting time than a second access window in the unlicensed carrier associated with a second sidelink sub-channel of the licensed carrier, and wherein the first sidelink sub-channel is associated with a higher quality of service priority than the second sidelink sub-channel.

In a seventeenth aspect, alone or in combination with one or more of the first through sixteenth aspects, the first access window is associated with at least one of a different range of cyclic prefix extensions or a different number of mini-slots for the multiple data channels than the second access window.

In an eighteenth aspect, alone or in combination with one or more of the first through seventeenth aspects, the licensed carrier and the unlicensed carrier are associated with separate channel occupancy ratio statuses, separate channel occupancy ratio limits for the same channel busy rate value, or a combination thereof.

In a nineteenth aspect, alone or in combination with one or more of the first through eighteenth aspects, a channel occupancy ratio limit for the unlicensed carrier is calculated based at least in part on a channel busy rate measured for the licensed carrier.

In a twentieth aspect, alone or in combination with one or more of the first through nineteenth aspects, a channel occupancy ratio limit for the unlicensed carrier is calculated based at least in part on the lesser of a first channel busy rate estimate for the licensed carrier and a second channel busy rate estimate for the unlicensed carrier.

In a twenty-first aspect, alone or in combination with one or more of the first through twentieth aspects, the indication further indicates that sidelink control information is to be transmitted using one or more data channels of the multiple data channels.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
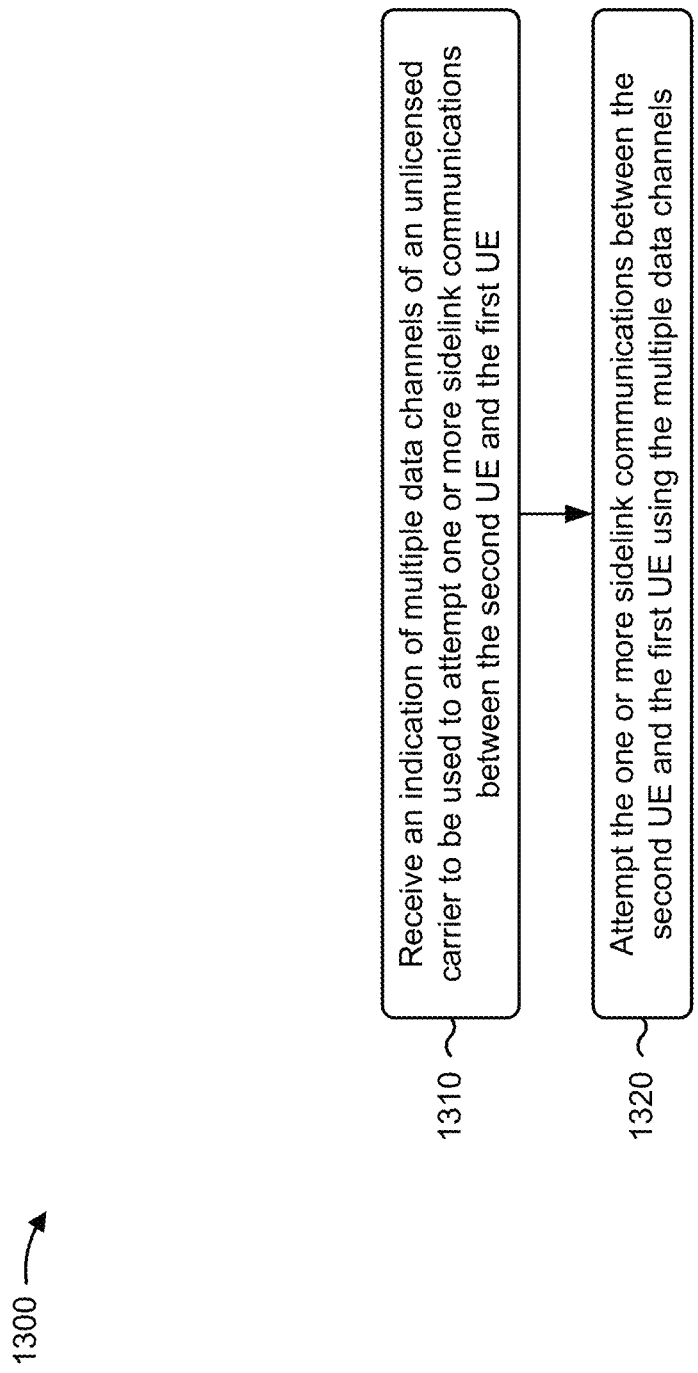

FIG. 13 is a diagram illustrating an example process 1300 performed, for example, by a second UE, in accordance with the present disclosure. Example process 1300 is an example where the second UE (e.g., UE 120) performs operations associated with licensed assisted sidelink access using an indication of multiple data channels.

As shown in FIG. 13, in some aspects, process 1300 may include receiving, from a first UE via a sidelink sub-channel of a licensed carrier, an indication of multiple data channels of an unlicensed carrier to be used to attempt one or more sidelink communications between the second UE and the first UE (block 1310). For example, the second UE (e.g., using receive processor 258, controller/processor 280, and/or memory 282) may receive, from a first UE via a sidelink sub-channel of a licensed carrier, an indication of multiple data channels of an unlicensed carrier to be used to attempt one or more sidelink communications between the second UE and the first UE, as described above.

As further shown in FIG. 13, in some aspects, process 1300 may include attempting the one or more sidelink communications between the second UE and the first UE using the multiple data channels (block 1320). For example, the second UE (e.g., using receive processor 258, transmit processor 264, controller/processor 280, and/or memory 282) may attempt the one or more sidelink communications between the second UE and the first UE using the multiple data channels, as described above.

Process 1300 may include additional aspects, such as any single aspect or any combination of aspects described below and/or in connection with one or more other processes described elsewhere herein.

In a first aspect, the multiple data channels are contiguous.

In a second aspect, alone or in combination with the first aspect, the indication identifies one or more resources of the licensed carrier to be used for hybrid automatic repeat request feedback corresponding to the multiple data channels.

In a third aspect, alone or in combination with one or more of the first and second aspects, the indication includes one or more transmission parameters for the multiple data channels, wherein the one or more transmission parameters include one or more carrier frequency indications for the multiple data channels, one or more bandwidth part indicators for the multiple data channels, one or more transmission configuration indicator states for the multiple data channels, one or more time domain resource allocations for the multiple data channels, one or more frequency domain resource allocations for the multiple data channels, one or more modulation and coding schemes for the multiple data channels, one or more hybrid automatic repeat request parameters for the multiple data channels, one or more sounding reference signal resource indicators for the multiple data channels, or a combination thereof.

In a fourth aspect, alone or in combination with one or more of the first through third aspects, the multiple data channels are grouped into multiple groups, and wherein data channels included in a same group are associated with one or more common transmission parameters.

In a fifth aspect, alone or in combination with one or more of the first through fourth aspects, the multiple data channels start with one or more mini-slot-based data channels.

In a sixth aspect, alone or in combination with one or more of the first through fifth aspects, the indication is included in sidelink control information, a MAC-CE, a radio resource control configuration message, or a combination thereof.

In a seventh aspect, alone or in combination with one or more of the first through sixth aspects, the indication identifies a traffic direction for the multiple data channels, wherein the traffic direction is from the first UE to the second UE or from the second UE to the first UE.

In an eighth aspect, alone or in combination with one or more of the first through seventh aspects, the indication identifies a switch in traffic direction between a first set of data channels, of the multiple data channels, and a second set of data channels of the multiple data channels.

In a ninth aspect, alone or in combination with one or more of the first through eighth aspects, the indication identifies at least one of a time gap or a cyclic prefix extension for a listen-before-talk procedure associated with the switch in traffic direction.

In a tenth aspect, alone or in combination with one or more of the first through ninth aspects, attempting the one or more sidelink communications comprises performing a Type 2 listen-before-talk procedure for transmission of a sidelink communication in a later data channel, of the multiple data channels, after successful reception of a sidelink communication in an earlier data channel of the multiple data channels.

In an eleventh aspect, alone or in combination with one or more of the first through tenth aspects, attempting the one or more sidelink communications comprises performing a first listen-before-talk procedure for a first data channel, of the multiple data channels, in which the second UE is to attempt to transmit a sidelink communication to the first UE, and selectively transmitting the sidelink communication via the first data channel or performing a second listen-before-talk procedure for a second data channel, of the multiple data channels, based at least in part on whether the first listen-before-talk procedure succeeds.

In a twelfth aspect, alone or in combination with one or more of the first through eleventh aspects, attempting the one or more sidelink communications comprises performing blind decoding for a data channel, of the multiple data channels, in which the second UE is to attempt to receive a sidelink communication from the first UE based at least in part on the indication.

In a thirteenth aspect, alone or in combination with one or more of the first through twelfth aspects, the indication and an initial data channel, of the multiple data channels, are separated by a time gap.

In a fourteenth aspect, alone or in combination with one or more of the first through thirteenth aspects, the sidelink sub-channel of the licensed carrier is mapped to an access window associated with the unlicensed carrier, and wherein a starting data channel of the multiple data channels starts within the access window.

In a fifteenth aspect, alone or in combination with one or more of the first through fourteenth aspects, a first sidelink sub-channel of the licensed carrier is associated with a first access window in the unlicensed carrier that has an earlier starting time than a second access window in the unlicensed carrier associated with a second sidelink sub-channel of the licensed carrier, and wherein the first sidelink sub-channel is associated with a channel access penalty factor that is greater than a channel access penalty factor associated with the second sidelink sub-channel.

In a sixteenth aspect, alone or in combination with one or more of the first through fifteenth aspects, a first sidelink sub-channel of the licensed carrier is associated with a first access window in the unlicensed carrier that has an earlier starting time than a second access window in the unlicensed carrier associated with a second sidelink sub-channel of the licensed carrier, and wherein the first sidelink sub-channel is associated with a higher quality of service priority than the second sidelink sub-channel.

In a seventeenth aspect, alone or in combination with one or more of the first through sixteenth aspects, the first access window is associated with at least one of a different range of cyclic prefix extensions or a different number of mini-slots for the multiple data channels than the second access window.

In an eighteenth aspect, alone or in combination with one or more of the first through seventeenth aspects, the licensed carrier and the unlicensed carrier are associated with separate channel occupancy ratio statuses, separate channel occupancy ratio limits for the same channel busy rate value, or a combination thereof.

In a nineteenth aspect, alone or in combination with one or more of the first through eighteenth aspects, a channel occupancy ratio limit for the unlicensed carrier is calculated based at least in part on a channel busy rate measured for the licensed carrier.

In a twentieth aspect, alone or in combination with one or more of the first through nineteenth aspects, a channel occupancy ratio limit for the unlicensed carrier is calculated based at least in part on the lesser of a first channel busy rate estimate for the licensed carrier and a second channel busy rate estimate for the unlicensed carrier.

In a twenty-first aspect, alone or in combination with one or more of the first through twentieth aspects, the indication further indicates that sidelink control information is to be transmitted using one or more data channels of the multiple data channels.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
   a memory; and
   one or more processors coupled to the memory, configured to:
   transmit, to a second UE via a sidelink sub-channel of a licensed carrier, an indication of multiple data channels of an unlicensed carrier to be used to attempt one or more sidelink communications between the first UE and the second UE, wherein the multiple data channels start with one or more mini-slot based data channels, wherein the indication identifies a switch in traffic direction between a first set of data channels of the multiple data channels and a second set of data channels of the multiple data channels, and wherein the indication identifies at least one of a time gap or a cyclic prefix extension for a listen-before-talk procedure associated with the switch in traffic direction; and
   attempt the one or more sidelink communications between the first UE and the second UE using the multiple data channels.

2. The first UE of claim 1, wherein the multiple data channels are:
   contiguous;

grouped into multiple groups, and wherein data channels included in a same group are associated with one or more common transmission parameters; or a combination thereof.

3. The first UE of claim 1, wherein the indication identifies one or more resources of the licensed carrier to be used for hybrid automatic repeat request feedback corresponding to the multiple data channels.

4. The first UE of claim 1, wherein the indication includes one or more transmission parameters for the multiple data channels, wherein the one or more transmission parameters include:
one or more carrier frequency indications for the multiple data channels,
one or more bandwidth part indicators for the multiple data channels,
one or more transmission configuration indicator states for the multiple data channels,
one or more time domain resource allocations for the multiple data channels,
one or more frequency domain resource allocations for the multiple data channels,
one or more modulation and coding schemes for the multiple data channels,
one or more hybrid automatic repeat request parameters for the multiple data channels,
one or more sounding reference signal resource indicators for the multiple data channels, or
a combination thereof.

5. The first UE of claim 1, wherein the indication is included in sidelink control information, a medium access control (MAC) control element, a radio resource control configuration message, or a combination thereof.

6. The first UE of claim 1, wherein the indication identifies a traffic direction for the multiple data channels, wherein the traffic direction is from the first UE to the second UE or from the second UE to the first UE.

7. The first UE of claim 1, wherein the one or more processors, when attempting the one or more sidelink communications, are configured to perform a Type 2 listen-before-talk procedure for transmission of a sidelink communication in a later data channel, of the multiple data channels, after successful reception of a sidelink communication in an earlier data channel of the multiple data channels.

8. The first UE of claim 1, wherein the one or more processors, when attempting the one or more sidelink communications, are configured to:
perform a first listen-before-talk procedure for a first data channel, of the multiple data channels, in which the first UE is to attempt to transmit a sidelink communication to the second UE; and
selectively transmit the sidelink communication via the first data channel or performing a second listen-before-talk procedure for a second data channel, of the multiple data channels, based at least in part on whether the first listen-before-talk procedure succeeds.

9. The first UE of claim 1, wherein the one or more processors, when attempting the one or more sidelink communications, are configured to perform blind decoding for a data channel, of the multiple data channels, in which the first UE is to attempt to receive a sidelink communication from the second UE based at least in part on the indication.

10. The first UE of claim 1, wherein the indication and an initial data channel, of the multiple data channels, are separated by a time gap.

11. The first UE of claim 1, wherein the sidelink sub-channel of the licensed carrier is mapped to an access window associated with the unlicensed carrier, and wherein a starting data channel of the multiple data channels starts within the access window.

12. The first UE of claim 1, wherein a first sidelink sub-channel of the licensed carrier is associated with a first access window in the unlicensed carrier that has an earlier starting time than a second access window in the unlicensed carrier associated with a second sidelink sub-channel of the licensed carrier, and wherein the first sidelink sub-channel is associated with a channel access penalty factor that is greater than a channel access penalty factor associated with the second sidelink sub-channel.

13. The first UE of claim 1, wherein a first sidelink sub-channel of the licensed carrier is associated with a first access window in the unlicensed carrier that has an earlier starting time than a second access window in the unlicensed carrier associated with a second sidelink sub-channel of the licensed carrier, and wherein the first sidelink sub-channel is associated with a higher quality of service priority than the second sidelink sub-channel, and wherein the first access window is associated with at least one of a different range of cyclic prefix extensions or a different number of mini-slots for the multiple data channels than the second access window.

14. The first UE of claim 1, wherein the licensed carrier and the unlicensed carrier are associated with separate channel occupancy ratio statuses, separate channel occupancy ratio limits for a same channel busy rate value, or a combination thereof.

15. The first UE of claim 1, wherein:
a channel occupancy ratio limit for the unlicensed carrier is calculated based at least in part on a channel busy rate measured for the licensed carrier; or
a channel occupancy ratio limit for the unlicensed carrier is calculated based at least in part on a lesser of a first channel busy rate estimate for the licensed carrier and a second channel busy rate estimate for the unlicensed carrier.

16. The first UE of claim 1, wherein the indication further indicates that sidelink control information is to be transmitted using one or more data channels of the multiple data channels.

17. A second user equipment (UE) for wireless communication, comprising:
a memory; and
one or more processors coupled to the memory, configured to:
receive, from a first UE via a sidelink sub-channel of a licensed carrier, an indication of multiple data channels of an unlicensed carrier to be used to attempt one or more sidelink communications between the second UE and the first UE, wherein the multiple data channels start with one or more mini-slot based data channels,
wherein the indication identifies a switch in traffic direction between a first set of data channels of the multiple data channels and a second set of data channels of the multiple data channels, and wherein the indication identifies at least one of a time gap or a cyclic prefix extension for a listen-before-talk procedure associated with the switch in traffic direction; and
attempt the one or more sidelink communications between the second UE and the first UE using the multiple data channels.

18. The second UE of claim 17, wherein the indication includes one or more transmission parameters for the multiple data channels, wherein the one or more transmission parameters include:
one or more carrier frequency indications for the multiple data channels,
one or more bandwidth part indicators for the multiple data channels,
one or more transmission configuration indicator states for the multiple data channels,
one or more time domain resource allocations for the multiple data channels,
one or more frequency domain resource allocations for the multiple data channels,
one or more modulation and coding schemes for the multiple data channels,
one or more hybrid automatic repeat request parameters for the multiple data channels,
one or more sounding reference signal resource indicators for the multiple data channels, or
a combination thereof.

19. The second UE of claim 17, wherein:
the indication is included in sidelink control information, a medium access control (MAC) control element, a radio resource control configuration message, or a combination thereof.

20. The second UE of claim 17, wherein the one or more processors, when attempting the one or more sidelink communications, are configured to:
perform a first listen-before-talk procedure for a first data channel, of the multiple data channels, in which the second UE is to attempt to transmit a sidelink communication to the first UE; and
selectively transmit the sidelink communication via the first data channel or performing a second listen-before-talk procedure for a second data channel, of the multiple data channels, based at least in part on whether the first listen-before-talk procedure succeeds.

21. The second UE of claim 17, wherein the one or more processors, when attempting the one or more sidelink communications, are configured to perform blind decoding for a data channel, of the multiple data channels, in which the second UE is to attempt to receive a sidelink communication from the first UE based at least in part on the indication.

22. A method of wireless communication performed by a first user equipment (UE), comprising:
transmitting, to a second UE via a sidelink sub-channel of a licensed carrier, an indication of multiple data channels of an unlicensed carrier to be used to attempt one or more sidelink communications between the first UE and the second UE, wherein the multiple data channels start with one or more mini-slot based data channels, wherein the indication identifies a switch in traffic direction between a first set of data channels of the multiple data channels and a second set of data channels of the multiple data channels, and wherein the indication identifies at least one of a time gap or a cyclic prefix extension for a listen-before-talk procedure associated with the switch in traffic direction; and
attempting the one or more sidelink communications between the first UE and the second UE using the multiple data channels.

23. The method of claim 22, wherein attempting the one or more sidelink communications comprises performing a Type 2 listen-before-talk procedure for transmission of a sidelink communication in a later data channel, of the multiple data channels, after successful reception of a sidelink communication in an earlier data channel of the multiple data channels.

24. The method of claim 22, wherein attempting the one or more sidelink communications comprises:
performing a first listen-before-talk procedure for a first data channel, of the multiple data channels, in which the first UE is to attempt to transmit a sidelink communication to the second UE; and
selectively transmitting the sidelink communication via the first data channel or performing a second listen-before-talk procedure for a second data channel, of the multiple data channels, based at least in part on whether the first listen-before-talk procedure succeeds.

25. A method of wireless communication performed by a second user equipment (UE), comprising:
receiving, from a first UE via a sidelink sub-channel of a licensed carrier, an indication of multiple data channels of an unlicensed carrier to be used to attempt one or more sidelink communications between the second UE and the first UE, wherein the multiple data channels start with one or more mini-slot based data channels, wherein the indication identifies a switch in traffic direction between a first set of data channels of the multiple data channels and a second set of data channels of the multiple data channels, and wherein the indication identifies at least one of a time gap or a cyclic prefix extension for a listen-before-talk procedure associated with the switch in traffic direction; and
attempting the one or more sidelink communications between the second UE and the first UE using the multiple data channels.

26. The method of claim 25, wherein:
the indication is included in sidelink control information, a medium access control (MAC) control element, a radio resource control configuration message, or a combination thereof.

27. The method of claim 25, wherein attempting the one or more sidelink communications comprises:
performing a first listen-before-talk procedure for a first data channel, of the multiple data channels, in which the second UE is to attempt to transmit a sidelink communication to the first UE; and
selectively transmitting the sidelink communication via the first data channel or performing a second listen-before-talk procedure for a second data channel, of the multiple data channels, based at least in part on whether the first listen-before-talk procedure succeeds.

28. The method of claim 25, wherein attempting the one or more sidelink communications comprises performing blind decoding for a data channel, of the multiple data channels, in which the second UE is to attempt to receive a sidelink communication from the first UE based at least in part on the indication.

29. The first UE of claim 1, wherein the indication is included in sidelink control information, a medium access control (MAC) control element, a radio resource control configuration message, or a combination thereof.

30. The method of claim 22, wherein the indication is included in sidelink control information, a medium access control (MAC) control element, a radio resource control configuration message, or a combination thereof.

* * * * *